United States Patent
Liu et al.

(10) Patent No.: US 11,051,254 B2
(45) Date of Patent: Jun. 29, 2021

(54) METHOD AND DEVICE IN A NODE USED FOR WIRELESS COMMUNICATION

(71) Applicant: SHANGHAI LANGBO COMMUNICATION TECHNOLOGY COMPANY LIMITED, Shanghai (CN)

(72) Inventors: Zheng Liu, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/796,910

(22) Filed: Feb. 20, 2020

(65) Prior Publication Data
US 2020/0275389 A1 Aug. 27, 2020

(30) Foreign Application Priority Data
Feb. 21, 2019 (CN) .......................... 201910130012.9

(51) Int. Cl.
| | |
|---|---|
| *H04W 52/36* | (2009.01) |
| *H04W 4/40* | (2018.01) |
| *H04W 72/04* | (2009.01) |
| *H04W 52/38* | (2009.01) |

(52) U.S. Cl.
CPC ........... *H04W 52/365* (2013.01); *H04W 4/40* (2018.02); *H04W 52/383* (2013.01); *H04W 72/044* (2013.01)

(58) Field of Classification Search
CPC ... H04W 4/40; H04W 52/365; H04W 52/383; H04W 72/044
USPC ........................... 455/41.2, 69, 522; 375/219
See application file for complete search history.

(56) References Cited

U.S. PATENT DOCUMENTS

| | | | | |
|---|---|---|---|---|
| 6,084,917 | A * | 7/2000 | Kao | H04L 27/2608 375/219 |
| 2017/0363738 | A1* | 12/2017 | Kaino | G01S 13/32 |
| 2019/0037499 | A1* | 1/2019 | Son | G08G 1/161 |
| 2019/0297581 | A1* | 9/2019 | Zhang | H04B 7/0426 |
| 2019/0319678 | A1* | 10/2019 | Jiang | H04B 7/043 |
| 2019/0335402 | A1* | 10/2019 | Zhang | H04B 7/0617 |
| 2019/0357218 | A1* | 11/2019 | Hou | H04W 4/40 |
| 2020/0275389 | A1* | 8/2020 | Liu | H04W 52/383 |

* cited by examiner

*Primary Examiner* — Tan H Trinh
(74) *Attorney, Agent, or Firm* — Maschoff Brennan

(57) ABSTRACT

The present disclosure discloses a method and a device in a communication node for wireless communications. The communication node monitors first-type information blocks in a first time window, receives a first signaling, and transmits a first radio signal; the first signaling is used for determining time-frequency resources occupied by the first radio signal; information carried by the first radio signal comprises a first difference value, a first reference power value is used for determining the first difference value, the first reference power value is a power value for a wireless transmission on sidelink; when X first-type information blocks are detected in the first time window, the X first-type information blocks respectively correspond to X first-type parameters, X is a positive integer greater than 1; the X first-type parameters are used for determining a target parameter, the target parameter is used for determining the first reference power.

20 Claims, 14 Drawing Sheets

| Indicator #1 | Indicator #2 | Indicator #3 | First Indicator | Indicator #5 | Indicator #6 | Indicator #7 | Indicator #8 |
|---|---|---|---|---|---|---|---|

...

| Indicator #a1 | Indicator #a2 | Indicator #a3 | Indicator #a4 | Indicator #a5 | Indicator #a6 | Indicator #a7 | Indicator #a8 |
|---|---|---|---|---|---|---|---|
| Difference #1 ||||||||
| Difference #2 ||||||||
| Difference #3 ||||||||
| First difference ||||||||
| Difference #5 ||||||||

...

| Difference #a8 |
|---|

FIG. 10

METHOD AND DEVICE IN A NODE USED FOR WIRELESS COMMUNICATION

CROSS REFERENCE TO RELATED APPLICATION

This application claims the priority benefit of Chinese Patent Application No. 201910130012.9, filed on Feb. 21, 2019, the full disclosure of which is incorporated herein by reference.

BACKGROUND

Technical Field

The present disclosure relates to transmission methods and devices in wireless communication systems, and in particular to a transmission scheme and device for sidelink in wireless communications.

Related Art

Application scenarios of future wireless communication systems are becoming increasingly diversified, and different application scenarios have different performance demands on the systems. In order to meet different performance requirements of various application scenarios, it was decided at the 3rd Generation Partner Project (3GPP) Radio Access Network (RAN) #72 plenary session that a study on New Radio (NR), or what is called Fifth Generation (5G) shall be conducted. The work item of NR was approved at the 3GPP RAN #75 plenary session to standardize NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

Compared with traditional LTE V2X system, NR V2X has a significant feature of supporting groupcast and unicast, and also Hybrid Automatic Repeat Request (HARM). Besides, at the 3GPP RAN1 Adhoc #1901 meeting, NR V2X is approved for supporting sidelink-based power control. In the current cellular system, not only uplink power control is performed, but uplink Power Headroom Report (PHR) is supported, the latter being a big help to the base station in radio resources allocating, adjusting Modulation and Coding Scheme (MCS) and conducting power adjustment to better adapt to link quality and interference environment. Similarly, sidelink-based power headroom calculation and report are also beneficial to sidelink scheduling.

To address the above problems that lie in power headroom calculating and reporting on NR V2X sidelink, the present disclosure provides a solution. It should be noted that the embodiments in a User Equipment (UE) of the present disclosure and the characteristics in the embodiments may be applied to a base station of the present disclosure if there is no conflict, and vice versa. And the embodiments and the characteristics in the embodiments can be mutually combined if no conflict is incurred.

The present disclosure provides a method in a first communication node used for wireless communications, comprising:
monitoring first-type information blocks in a first time window;
receiving a first signaling; and
transmitting a first radio signal;
herein, the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the X first-type parameters are used to determine the target parameter, which in turn is used to determine the first reference power value, therefore, power headroom for sidelink can be calculated when there are a plurality of sidelink transmissions (particularly when targeting various receivers), providing a reference for sidelink resources allocation and scheduling, and thus improving the performance of sidelink transmission.

According to one aspect of the present disclosure, the above method is characterized in further comprising:
receiving a second information block;
herein, the second information block is used for determining a first variant;
when none of the first-type information blocks is detected in the first time window, the first reference power value is dependent on the first variant.

According to one aspect of the present disclosure, the above method is characterized in further comprising:
transmitting X radio signals;
herein, the X first-type information blocks are used for determining time-frequency resources occupied by the X radio signals respectively, the first reference power value is equal to a transmitting power of one of the X radio signals; any of the X radio signals and the first radio signal are transmitted via different air interfaces.

According to one aspect of the present disclosure, the above method is characterized in further comprising:
receiving a third information block;
herein, the third information block is used for determining a second variant, the second variant is used for determining a first upper bound value, the first difference is equal to a difference between the first upper bound value and the first reference power value.

According to one aspect of the present disclosure, the above method is characterized in that information carried by the first radio signal comprises a first indicator, wherein the first indicator is used for indicating that the first difference is for sidelink, or the first indicator is used for indicating that the first difference is for uplink.

In one embodiment, when the first communication node is within coverage, the first indicator enables a base station to independently acquire information of power headroom of both uplink and sidelink, so as to optimize varying transmission environments or transmission links accordingly and thus enhance sidelink and uplink transmission performance.

According to one aspect of the present disclosure, the above method is characterized in that information carried by the first radio signal comprises a second difference, the first difference and the second difference respectively correspond to a first distance interval and a second distance interval, the first distance interval and the second distance interval are orthogonal.

In one embodiment, power headroom reports are provided in accordance with distance intervals, thereby increasing the precision of power headroom reports, ensuring the efficiency of link self-adaptability, and enhancing the performance of link self-adaptability.

According to one aspect of the present disclosure, the above method is characterized in that an end of the first time window is related to a receiving time of the first signaling, and a start of the first time window is related to a triggering time of a report of the first difference.

In one embodiment, the restriction of the first time window results in avoidance of calculation of power headroom in data processing, thereby reducing the complexity of power headroom calculation.

The present disclosure provides a method in a second communication node used for wireless communications, comprising:

transmitting X first-type information blocks in a first time window;

transmitting a first signaling; and receiving a first radio signal;

herein, the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

According to one aspect of the present disclosure, the above method is characterized in further comprising:

transmitting a second information block;

herein, the second information block is used for determining a first variant;

when none of the first-type information blocks is detected in the first time window, the first reference power value is dependent on the first variant.

According to one aspect of the present disclosure, the above method is characterized in further comprising:

transmitting a third information block;

herein, the third information block is used for determining a second variant, the second variant is used for determining a first upper bound value, the first difference is equal to a difference between the first upper bound value and the first reference power value.

According to one aspect of the present disclosure, the above method is characterized in that information carried by the first radio signal comprises a first indicator, the first indicator is used for indicating that the first difference is for sidelink, or the first indicator is used for indicating that the first difference is for uplink.

According to one aspect of the present disclosure, the above method is characterized in that information carried by the first radio signal comprises a second difference, the first difference and the second difference respectively correspond to a first distance interval and a second distance interval. The first distance interval and the second distance interval are orthogonal.

According to one aspect of the present disclosure, the above method is characterized in that an end of the first time window is related to a receiving time of the first signaling, and a start of the first time window is related to a triggering time of a report of the first difference.

The present disclosure provides a first communication node used for wireless communications, comprising:

a first receiver, monitoring first-type information blocks in a first time window;

a second receiver, receiving a first signaling; and a first transmitter, transmitting a first radio signal;

herein, the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

The present disclosure provides a second communication node used for wireless communications, comprising:

a second transmitter, transmitting X first-type information blocks in a first time window;

a third transmitter, transmitting a first signaling; and a third receiver, receiving a first radio signal;

herein, the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

In one embodiment, the methods in the present disclosure have the following advantages:

Realizing power headroom calculation for sidelink when there exist multiple sidelink transmissions (especially when targeting different receivers), providing a reference for sidelink resources allocating and scheduling and hence an enhancement in the performance in the sidelink transmissions;

enabling the base station to independently acquire information of uplink and sidelink power headroom, thereby allowing for optimization of varying transmission environments or transmission links, and enhancing sidelink and uplink transmission performance;

providing PHR according to different distance intervals, which helps improve PHR precision, ensures efficiency of link's self-adaptability and finally enhances the link's self-adaptability; and avoiding power headroom calculation in data processing (packet transmission for uplink) and thus reducing the complexity of power headroom calculation.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of relation between a first indicator and a first difference according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
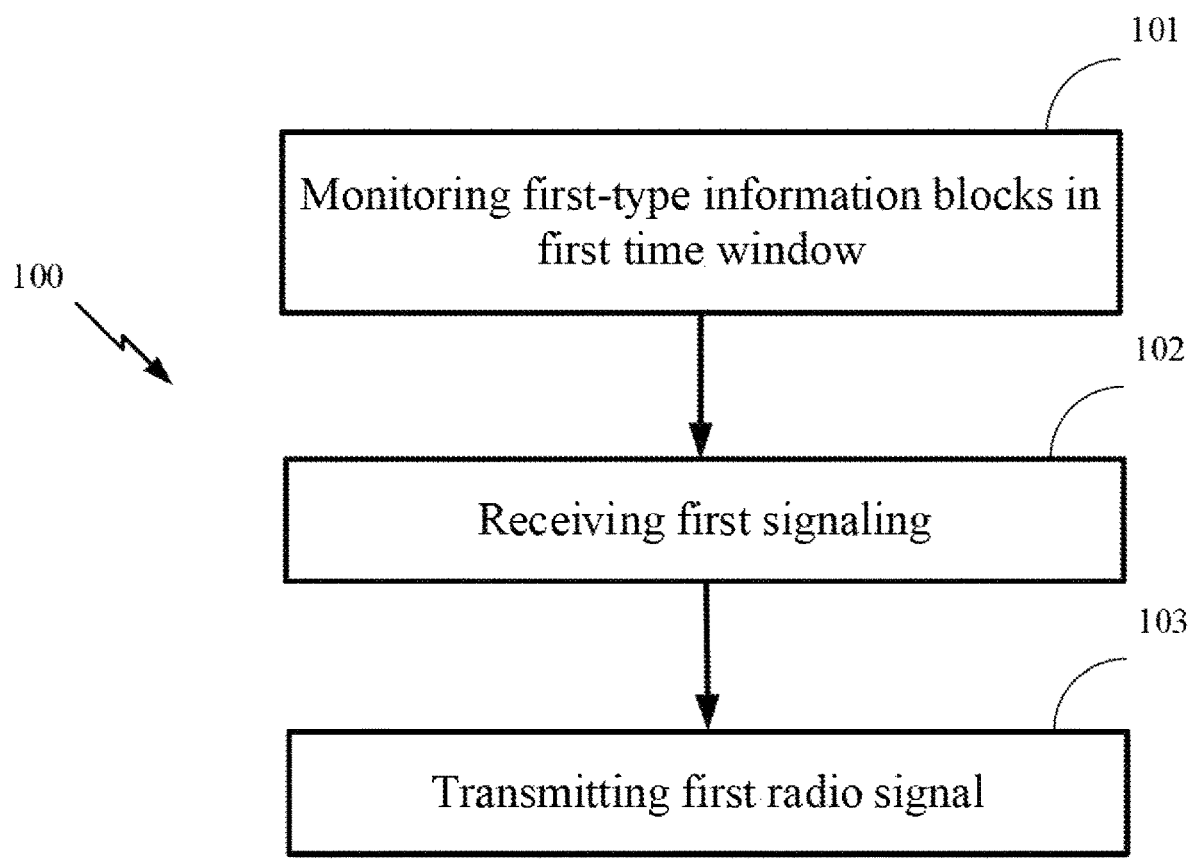
FIG. 1 illustrates a flowchart of transmissions of first-type information blocks, a first signaling and a first radio signal according to one embodiment of the present disclosure.

Embodiment 1 illustrates a flowchart of transmissions of first-type information blocks, a first signaling and a first radio signal according to one embodiment of the present disclosure, as shown in FIG. 1. In FIG. 1, each box represents a step. It should be noted that the sequence of boxes in FIG. 1 does not necessarily mean that steps represented by these boxes are arranged in a chronological order.

In Embodiment 1, the first communication node in the present disclosure monitors first-type information blocks in a first time window; and receives a first signaling and transmits a first radio signal; the first signaling is used for determining time domain resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the first communication node is a UE.

In one embodiment, the first communication node is vehicle-mounted communication equipment.

In one embodiment, the first communication node is a UE capable of V2X communication.

In one embodiment, length of the first time window is greater than 0.

In one embodiment, the first-type information blocks are transmitted via an air interface.

In one embodiment, the first-type information blocks are transmitted internally within the first communication node.

In one embodiment, the first-type information blocks are transmitted between internal interfaces of the first communication node.

In one embodiment, the first-type information blocks are transmitted via a Uu interface.

In one embodiment, the first-type information blocks are transmitted via a Pc5 interface.

In one embodiment, the first-type information blocks are transmitted between the second communication node of the present disclosure and the first communication node of the present disclosure.

In one embodiment, the first-type information blocks are transmitted via a radio interface.

In one embodiment, the first-type information blocks are transmitted between a higher layer of the first communication node and a physical layer of the first communication node.

In one embodiment, the first-type information blocks comprise physical layer information.

In one embodiment, the first-type information blocks comprise higher-layer information.

In one embodiment, the first-type information blocks are transmitted via a physical layer signaling.

In one embodiment, the first-type information blocks are transmitted via a higher layer signaling.

In one embodiment, the first-type information blocks comprise all or part of a piece of higher layer information.

In one embodiment, the first-type information blocks comprise all or part of a piece of physical layer information.

In one embodiment, the first-type information blocks are transmitted through a Downlink Shared Channel (DL-SCH).

In one embodiment, the first-type information blocks are transmitted through a Physical Downlink Shared Channel (PDSCH).

In one embodiment, the first-type information blocks are broadcast.

In one embodiment, the first-type information blocks are unicast.

In one embodiment, the first-type information blocks are cell-specific.

In one embodiment, the first-type information blocks are UE-specific.

In one embodiment, the first-type information blocks are transmitted through a Physical Downlink Control Channel (PDCCH).

In one embodiment, the first-type information blocks comprise all or part of fields of a Downlink Control Information (DCI) signaling.

In one embodiment, the first-type information blocks comprise all or part of fields of a DCI signaling used for sidelink.

In one embodiment, the first-type information blocks comprise all or part of fields of DCI Format 3 in 3GPP TS36.212 (v15.4.0).

In one embodiment, the first-type information blocks comprise all or part of fields of DCI Format 4 in 3GPP TS38.212.

In one embodiment, the monitoring of the first communication node on the first-type information blocks is performed by energy detection.

In one embodiment, the monitoring of the first communication node on the first-type information blocks is performed by decoding of the first-type information blocks.

In one embodiment, the monitoring of the first communication node on the first-type information blocks is performed by determining whether the first-type information blocks are transmitted internally within the first communication node.

In one embodiment, the monitoring of the first communication node on the first-type information blocks is performed by blind decoding of the first-type information blocks.

In one embodiment, the monitoring of the first communication node on the first-type information blocks is performed by matching Cyclic Redundancy Check (CRC) of the first-type information blocks.

In one embodiment, the monitoring of the first communication node on the first-type information blocks is performed by determining whether CRC of the first-type information blocks have been passed.

In one embodiment, the monitoring of the first communication node on the first-type information blocks is performed by matching CRC of the first-type information blocks employing a characteristic identifier of the first communication node.

In one embodiment, the first signaling is a higher layer signaling.

In one embodiment, the first signaling is a physical layer signaling.

In one embodiment, the first signaling comprises all or part of a higher layer signaling.

In one embodiment, the first signaling comprises all or part of a physical layer signaling.

In one embodiment, the first signaling is transmitted through a Downlink Shared Channel (DL-SCH).

In one embodiment, the first signaling is transmitted through a Physical Downlink Shared Channel (PDSCH).

In one embodiment, the first signaling comprises all or part of Information Elements (IEs) of a Radio Resource Control (RRC) signaling.

In one embodiment, the first signaling comprises all or part of fields of an IE of an RRC signaling.

In one embodiment, the first signaling comprises one or more fields of a System Information Block (SIB).

In one embodiment, the first signaling is broadcast.

In one embodiment, the first signaling is unicast.

In one embodiment, the first signaling is cell-specific.

In one embodiment, the first signaling is UE-specific.

In one embodiment, the first signaling is transmitted through a Physical Downlink Control Channel (PDCCH).

In one embodiment, the first signaling comprises all or part of fields of a DCI signaling.

In one embodiment, the first signaling comprises all or part of fields of a DCI signaling used for scheduling Uplink Shared Channel (UL-SCH).

In one embodiment, the first signaling comprises a UL Grant.

In one embodiment, the first signaling comprises all or part of fields of DCI Format 0-0 in 3GPP TS38.212 (v15.4.0).

In one embodiment, the first signaling comprises all or part of fields of DCI Format 0-1 in 3GPP TS38.212 (v15.4.0).

In one embodiment, the above phrase that the first signaling is used for determining time domain resources occupied by the first radio signal includes the meaning that the first signaling is used by the first communication node for determining time-frequency resources occupied by the first radio signal.

In one embodiment, the above phrase that the first signaling is used for determining time domain resources occupied by the first radio signal includes the meaning that the first signaling is used for directly indicating time-frequency resources occupied by the first radio signal.

In one embodiment, the above phrase that the first signaling is used for determining time domain resources occupied by the first radio signal includes the meaning that the first signaling is used for indirectly indicating time-frequency resources occupied by the first radio signal.

In one embodiment, the above phrase that the first signaling is used for determining time domain resources occupied by the first radio signal includes the meaning that the first signaling is used for explicitly indicating time-frequency resources occupied by the first radio signal.

In one embodiment, the above phrase that the first signaling is used for determining time domain resources occupied by the first radio signal includes the meaning that the first signaling is used for implicitly indicating time-frequency resources occupied by the first radio signal.

In one embodiment, the first signaling is also used for determining an MCS employed by the first radio signal.

In one embodiment, the first signaling is also used for determining a Redundancy Version (RV) employed by the first radio signal.

In one embodiment, the first signaling is also used for determining a Hybrid Automatic Repeat Request (HARQ) process to which the first radio signal belongs.

In one embodiment, the first signaling is also used for determining an antenna port employed by the first radio signal.

In one embodiment, a target receiver of the first radio signal is a base station (eNB, gNB).

In one embodiment, the first radio signal is transmitted via a Uu interface.

In one embodiment, the first radio signal is transmitted via a link between a base station and a UE.

In one embodiment, the first radio signal is transmitted via Uplink (UL).

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is an initial transmission belonging to a HARQ process.

In one embodiment, the first radio signal is not a HARQ retransmission.

In one embodiment, a Transport Block (TB) is sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation, and Modulation and Upconversion to generate the first radio signal.

In one embodiment, a TB is sequentially subjected to CRC Insertion, Segmentation, code block-level CRC Insertion, Channel Coding, Rate Matching, Concatenation, Scrambling, Modulation, Layer Mapping, Precoding, Mapping to Virtual Resource Blocks, Mapping from Virtual to Physical Resource Blocks, OFDM Baseband Signal Generation, and Modulation and Upconversion to generate the first radio signal.

In one embodiment, a TB is sequentially subjected to CRC Insertion, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion to generate the first radio signal.

In one embodiment, a TB is sequentially subjected to CRC Insertion, Segmentation, code block-level CRC Insertion, Channel Coding, Rate Matching, Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation, and Modulation and Upconversion to generate the first radio signal.

In one embodiment, the first radio signal comprises a Physical Uplink Shared Channel (PUSCH) and a Demodulation Reference Signal (DMRS).

In one embodiment, the first radio signal only comprises a PUSCH.

In one embodiment, information carried by the first radio signal belongs to higher layer information.

In one embodiment, information carried by the first radio signal includes Medium Access Control (MAC) layer information.

In one embodiment, information carried by the first radio signal includes MAC Control Element (CE) of MAC layer.

In one embodiment, information carried by the first radio signal includes MAC Header of MAC layer.

In one embodiment, information carried by the first radio signal includes MAC Subheader of MAC layer.

In one embodiment, the first difference is Power Headroom (PH).

In one embodiment, information carried by the first radio signal comprises Power Headroom Report (PHR).

In one embodiment, the first difference is a rational number.

In one embodiment, the first difference is positive.

In one embodiment, the first difference is negative.

In one embodiment, the first difference is equal to 0.

In one embodiment, the first difference is measured by mW.

In one embodiment, the first difference is measured by dB.

In one embodiment, the first difference is measured by dBm.

In one embodiment, the first reference power value is measured by mW.

In one embodiment, the first reference power value is measured by dBm.

In one embodiment, the first reference power value is measured by W.

In one embodiment, the first reference power value is a rational number.

In one embodiment, the first reference power value is positive.

In one embodiment, the above phrase that the first reference power value is a power value for wireless transmission on sidelink includes the meaning that the first reference power value is a power value estimated for wireless transmission on sidelink.

In one embodiment, the above phrase that the first reference power value is a power value for wireless transmission on sidelink includes the meaning that the first reference power value is a power value for actual wireless transmission on sidelink.

In one embodiment, the above phrase that the first reference power value is a power value for wireless transmission on sidelink includes the meaning that the first reference power value is a power value for virtual wireless transmission on sidelink.

In one embodiment, the above phrase that the first reference power value is a power value for wireless transmission on sidelink includes the meaning that the first reference power value is a power value estimated for virtual wireless transmission on sidelink.

In one embodiment, the above phrase that a first reference power value is used for determining the first difference includes the meaning that the first reference power value is used by the first communication node for determining the first difference.

In one embodiment, the above phrase that a first reference power value is used for determining the first difference includes the meaning that the first reference power value is subjected to functional calculation to determine the first difference.

In one embodiment, the above phrase that a first reference power value is used for determining the first difference includes the meaning that the first reference power value is subjected to mapping relationship to determine the first difference.

In one embodiment, the above phrase that a first reference power value is used for determining the first difference includes the meaning that a difference between a power value and the first reference power value is equal to the first difference.

In one embodiment, the above phrase that X first-type information blocks being detected in the first time window includes the meaning that each first-type information block of the X first-type information blocks is detected in the first time window.

In one embodiment, the above phrase that X first-type information blocks being detected in the first time window includes the meaning that time domain resources occupied by each of the X first-type information blocks belong to the first time window, and CRC check of each of the X first-type information blocks is passed.

In one embodiment, the above phrase that X first-type information blocks being detected in the first time window includes the meaning that time domain resources occupied by each of the X first-type information blocks belong to the first time window, and CRC matching of each of the X first-type information blocks is passed.

In one embodiment, the above phrase that X first-type information blocks being detected in the first time window includes the meaning that time domain resources occupied by each of the X first-type information blocks belong to the first time window, and CRC descrambled by each of the X first-type information blocks employing a characteristic identifier of the first communication node is passed.

In one embodiment, the above phrase that X first-type information blocks being detected in the first time window includes the meaning that time domain resources occupied by each of the X first-type information blocks belong to the first time window, and each of the X first-type information blocks is decoded correctly.

In one embodiment, the above phrase that X first-type information blocks being detected in the first time window includes the meaning that within the first time window, each of the X first-type information blocks is transmitted internally within the first communication node.

In one embodiment, the above phrase that X first-type information blocks being detected in the first time window includes the meaning that within the first time window, each of the X first-type information blocks is received by the physical layer of the first communication node.

In one embodiment, the above phrase that X first-type information blocks being detected in the first time window includes the meaning that within the first time window, each of the X first-type information blocks is decided by the scheduler of the first communication node.

In one embodiment, any of the X first-type parameters is a time value.

In one embodiment, any of the X first-type parameters is a time interval length value.

In one embodiment, any of the X first-type parameters is an index of a temporal position in time domain.

In one embodiment, any of the X first-type parameters is an order of a time position in time domain.

In one embodiment, any of the X first-type parameters is measured by ms.

In one embodiment, any of the X first-type parameters is measured by μs.

In one embodiment, any of the X first-type parameters is an index of a multicarrier symbol.

In one embodiment, any of the X first-type parameters is a pathloss value.

In one embodiment, any of the X first-type parameters is measured by dB.

In one embodiment, any of the X first-type parameters is a power value.

In one embodiment, any of the X first-type parameters is measured by mW.

In one embodiment, any of the X first-type parameters is measured by dBm.

In one embodiment, any of the X first-type parameters is measured by W.

In one embodiment, the above phrase that the X first-type information blocks respectively correspond to X first-type parameters includes the meaning that the X first-type parameters are respectively start times for receptions of the X first-type information blocks.

In one embodiment, the above phrase that the X first-type information blocks respectively correspond to X first-type parameters includes the meaning that the X first-type parameters are respectively end times for receptions of the X first-type information blocks.

In one embodiment, the above phrase that the X first-type information blocks respectively correspond to X first-type parameters includes the meaning that the X first-type parameters are respectively start times for arrivals of the X first-type information blocks at the physical layer of the first communication node.

In one embodiment, the above phrase that the X first-type information blocks respectively correspond to X first-type parameters includes the meaning that the X first-type parameters are respectively end times for arrivals of the X first-type information blocks at the physical layer of the first communication node.

In one embodiment, the above phrase that the X first-type information blocks respectively correspond to X first-type parameters includes the meaning that the X first-type parameters are respectively determined through the X first-type information blocks.

In one embodiment, the above phrase that the X first-type information blocks respectively correspond to X first-type parameters includes the meaning that the X first-type parameters are respectively carried by the X first-type information blocks.

In one embodiment, the above phrase that the X first-type information blocks respectively correspond to X first-type parameters includes the meaning that the X first-type parameters are respectively indicated by the X first-type information blocks.

In one embodiment, the above phrase that the X first-type information blocks respectively correspond to X first-type parameters includes the meaning that the X first-type information blocks respectively comprise the X first-type parameters.

In one embodiment, the above phrase that the X first-type information blocks respectively correspond to X first-type parameters includes the meaning that the X first-type information blocks are respectively used for scheduling transmissions on X sidelinks, and the X first-type parameters respectively correspond to pathlosses (PLs) of the X sidelinks.

In one embodiment, the above phrase that the X first-type information blocks respectively correspond to X first-type parameters includes the meaning that the X first-type information blocks are respectively used for scheduling transmissions on X sidelinks, and the X first-type parameters respectively correspond to PLs between the first communication node to target receivers of the X sidelinks.

In one embodiment, the above phrase that the X first-type information blocks respectively correspond to X first-type parameters includes the meaning that the X first-type parameters are respectively X reference power values, the X first-type information blocks are used for determining the X reference power values respectively.

In one embodiment, the above phrase that the X first-type parameters are used for determining a target parameter includes the meaning that the target parameter is one of the X first-type parameters.

In one embodiment, the above phrase that the X first-type parameters are used for determining a target parameter includes the meaning that the target parameter is a greatest first-type parameter of the X first-type parameters.

In one embodiment, the above phrase that the X first-type parameters are used for determining a target parameter includes the meaning that the target parameter is a smallest first-type parameter of the X first-type parameters.

In one embodiment, the above phrase that the X first-type parameters are used for determining a target parameter includes the meaning that the target parameter is equal to an average of the X first-type parameters.

In one embodiment, the above phrase that the X first-type parameters are used for determining a target parameter includes the meaning that the target parameter is equal to a weighted average of the X first-type parameters.

In one embodiment, the above phrase that the X first-type parameters are used for determining a target parameter includes the meaning that the X first-type parameters are subjected to functional calculation to obtain the target parameter.

In one embodiment, the above phrase that the X first-type parameters are used for determining a target parameter includes the meaning that the X first-type parameters are subjected to mapping relationship to obtain the target parameter.

In one embodiment, the above phrase that the X first-type parameters are used for determining a target parameter includes the meaning that any of the X first-type parameters is an order of a time position in time domain, and the target parameter is equal to a first-type parameter with an order of the latest time position among the X first-type parameters.

In one embodiment, the above phrase that the X first-type parameters are used for determining a target parameter includes the meaning that any of the X first-type parameters is an order of a time position in time domain, and the target parameter is equal to a first-type parameter with an order of the earliest time position among the X first-type parameters.

In one embodiment, the above phrase that the target parameter is used for determining the first reference power value includes the meaning that the target parameter is the first reference power value.

In one embodiment, the above phrase that the target parameter is used for determining the first reference power value includes the meaning that the target parameter is equivalent to the first reference power value.

In one embodiment, the above phrase that the target parameter is used for determining the first reference power value includes the meaning that the target parameter is one of the X first-type parameters, a first-type information block corresponding to the target parameter out of the X first-type information blocks is used for determining the first reference power value.

In one embodiment, the above phrase that the target parameter is used for determining the first reference power value includes the meaning that any of the X first-type parameters is an order of a time position in time domain, the target parameter is equal to a first-type parameter with an order of the latest time position among the X first-type parameters, and a first-type information block with the latest start time for reception among the X first-type information blocks is used for determining the first reference power value.

In one embodiment, the above phrase that the target parameter is used for determining the first reference power value includes the meaning that any of the X first-type parameters is an order of a time position in time domain, the target parameter is equal to a first-type parameter with an order of the earliest time position among the X first-type parameters, and the first-type information block with the earliest start time for reception among the X first-type information blocks is used for determining the first reference power value.

In one embodiment, the above phrase that the target parameter is used for determining the first reference power value includes the meaning that the target parameter is used by the first communication node for determining the first reference power value.

In one embodiment, the above phrase that the target parameter is used for determining the first reference power value includes the meaning that the target parameter is subjected to functional calculation to determine the first reference power value.

In one embodiment, the above phrase that the target parameter is used for determining the first reference power value includes the meaning that the target parameter is subjected to mapping relationship to determine the first reference power value.

In one embodiment, the above phrase that the target parameter is used for determining the first reference power value includes the meaning that the first reference power value is linear with the target parameter.

In one embodiment, the above phrase that the target parameter is used for determining the first reference power value includes the meaning that with a given pathloss factor ($\alpha$), the first reference power value is linear with the target parameter.

In one embodiment, the above phrase that the target parameter is used for determining the first reference power value includes the meaning that the first reference power value is in proportion to the target parameter.

In one embodiment, the target parameter is a time value.

In one embodiment, the target parameter is a time interval length value.

In one embodiment, the target parameter is an index of a temporal position in time domain.

In one embodiment, the target parameter is an order of a time position in time domain.

In one embodiment, the target parameter is an index of a multicarrier symbol.

In one embodiment, the target parameter is a pathloss value.

In one embodiment, the target parameter is measured by dB.

In one embodiment, the target parameter is a power value.

In one embodiment, the target parameter is measured by mW.

In one embodiment, the target parameter is measured by dBm.

In one embodiment, the target parameter is measured by W.

Embodiment 2

Figure 2:
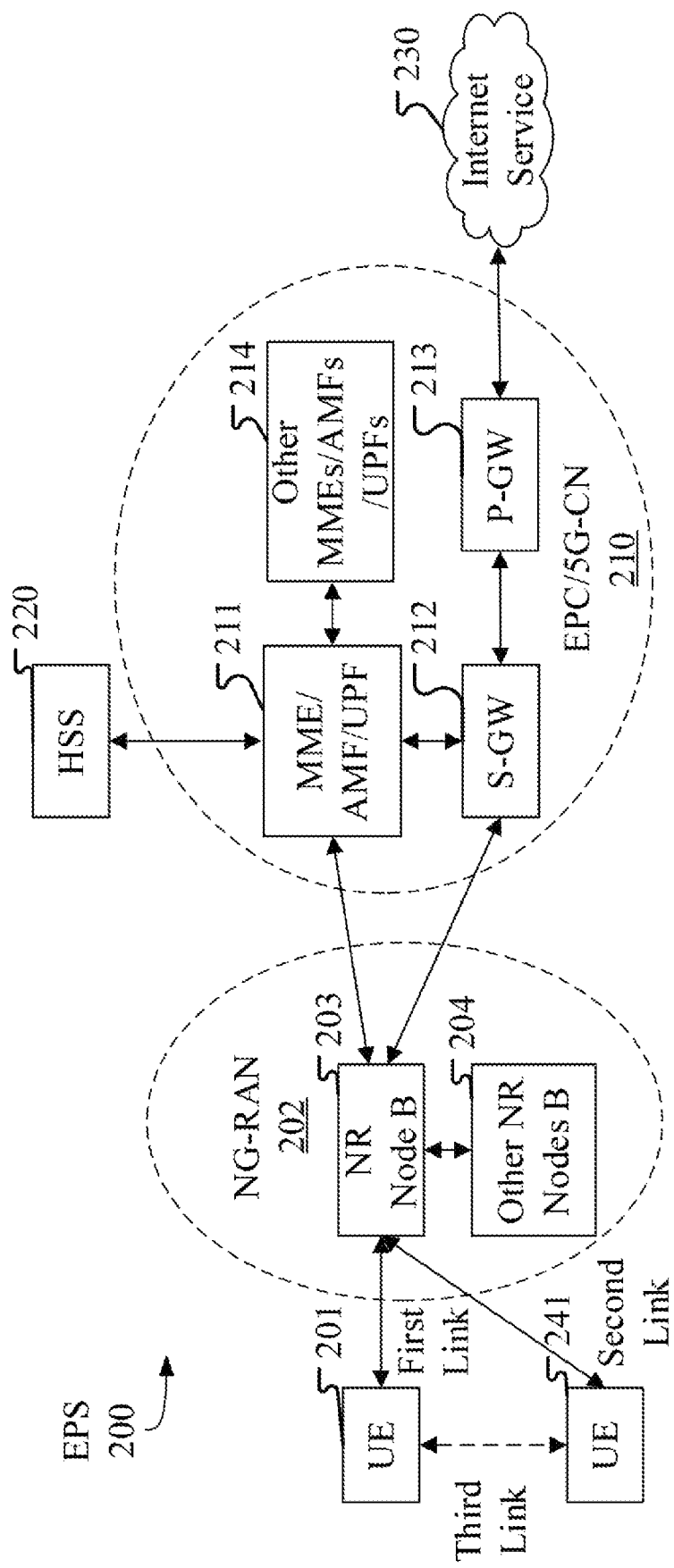
FIG. 2 illustrates a schematic diagram of network architecture according to one embodiment of the present disclosure.

Embodiment 2 illustrates a schematic diagram of a network architecture, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-CoreNetwork (5G-CN/EPC) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, a gNB 203 may be a base station, a terrestrial base station with satellite relay or a Road Side Unit (RSU). The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, communication units in automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching (PS) Streaming Services.

In one embodiment, the UE 201 corresponds to the first communication node in the present disclosure.

In one embodiment, the UE 201 supports sidelink transmission.

In one embodiment, the UE 201 supports PC5 interface.

In one embodiment, the UE 201 supports Vehicle-to-Everything.

In one embodiment, the UE 201 supports V2X traffic.

In one embodiment, the gNB 203 corresponds to the second communication node in the present disclosure.

In one embodiment, the gNB 203 supports Vehicle-to-Everything.

In one embodiment, the gNB 203 supports V2X traffic.

Embodiment 3

Figure 3:
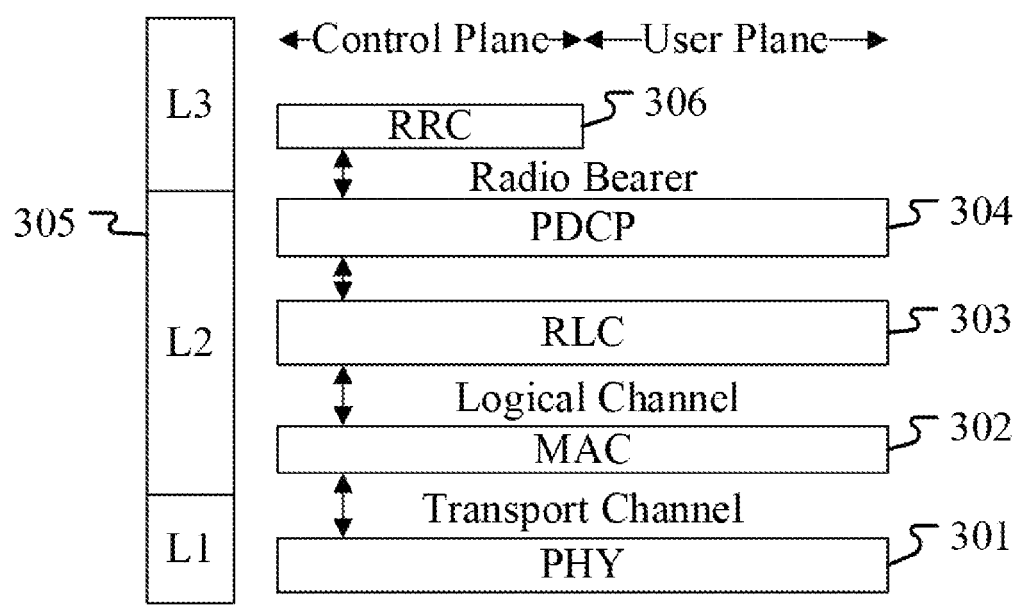
FIG. 3 illustrates a schematic diagram of a radio protocol architecture of a user plane and a control plane according to one embodiment of the present disclosure

Embodiment 3 illustrates a schematic diagram of an embodiment of a radio protocol architecture of a user plane and a control plane according to the present disclosure, as shown in FIG. 3. FIG. 3 is a schematic diagram illustrating a radio protocol architecture of a user plane and a control plane. In FIG. 3, the radio protocol architecture for a first communication node (a UE or an RSU in V2X) and a second communication node (gNB, eNB), or between two UEs, is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node, or between two UEs via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for first communication node handover between second communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource blocks) in a cell. The MAC sublayer 302 is also in charge of HARQ operation. In the control plane, the radio protocol architecture of the first communication node and the second communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second communication node and the first communication node.

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, any one of the X pieces of first-type information in the present disclosure is generated by the RRC sublayer 306.

In one embodiment, any one of the X pieces of first-type information in the present disclosure is generated by the MAC sublayer 302.

In one embodiment, any one of the X pieces of first-type information in the present disclosure is generated by the PHY 301.

In one embodiment, the first radio signal in the present disclosure is generated by the RRC sublayer 306.

In one embodiment, the first radio signal in the present disclosure is generated by the MAC sublayer 302.

In one embodiment, the first radio signal in the present disclosure is generated by the PHY 301.

In one embodiment, the first signaling in the present disclosure in the present disclosure is generated by the RRC sublayer 306.

In one embodiment, the first signaling in the present disclosure in the present disclosure is generated by the MAC sublayer 302.

In one embodiment, the first signaling in the present disclosure in the present disclosure is generated by the PHY 301.

In one embodiment, the second information blocks in the present disclosure is generated by the RRC sublayer 306.

In one embodiment, the second information blocks in the present disclosure is generated by the MAC sublayer 302.

In one embodiment, the second information blocks in the present disclosure is generated by the PHY 301.

In one embodiment, any of the X radio signals in the present disclosure is generated by the RRC sublayer 306.

In one embodiment, any of the X radio signals in the present disclosure is generated by the MAC sublayer 302.

In one embodiment, any of the X radio signals in the present disclosure is generated by the PHY 301.

In one embodiment, the third information blocks in the present disclosure is generated by the RRC sublayer 306.

In one embodiment, the third information blocks in the present disclosure is generated by the MAC sublayer 302.

In one embodiment, the third information blocks in the present disclosure is generated by the PHY 301.

Embodiment 4

Figure 4:
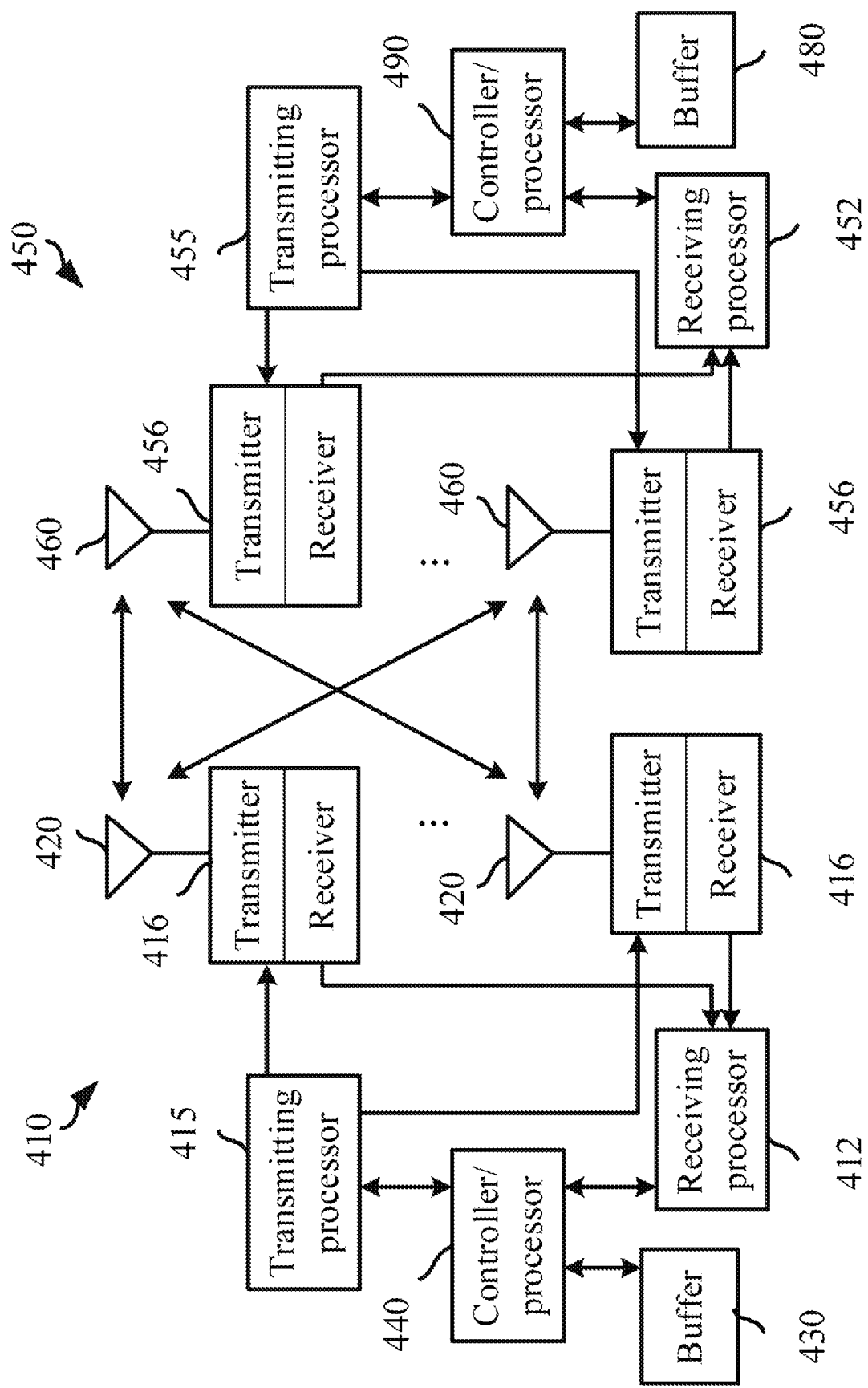
FIG. 4 illustrates a schematic diagram of a first communication node and a second communication node according to one embodiment of the present disclosure.

Embodiment 4 illustrates a schematic diagram of a first communication node and a second communication node, as shown in FIG. 4.

A first communication node 450 comprises a controller/processor 490, a buffer 480, a receiving processor 452, a transmitter/receiver 456, a transmitting processor 455 and a data source 467, wherein the transmitter/receiver 456 comprising an antenna 460. The data source 467 or the buffer 480 provides a higher-layer packet to the controller/processor 490, the controller/processor 490 provides header compression and decompression, encryption and decryption, packet segmentation and reordering as well as multiplexing and demultiplexing between a logical channel and a transport channel, so as to implement the L2 layer protocol for the user plane and the control plane. The higher-layer packet may comprise data or control information, such as a DL-SCH, a UL-SCH or a SL-SCH. The transmitting processor 455 performs various signal transmitting processing functions used for the L1 layer (i.e., PHY), including coding, interleaving, scrambling, modulation, power control/allocation, precoding and generation of physical layer control signaling. The receiving processor 452 performs various signal receiving processing functions used for the L1 layer (i.e., PHY), including decoding, deinterleaving, descrambling, demodulation, de-precoding and extraction of physical layer control signaling. The transmitter 456 is configured to convert a baseband signal provided by the transmitting processor 455 into a Radio Frequency (RF) signal to be transmitted via the antenna 460, and the receiver 456 is configured to convert the RF signal received via the antenna 460 into a baseband signal to be provided to the receiving processor 452.

The second communication node 410 may comprise a controller/processor 440, a buffer 430, a receiving processor 412, a transmitter/receiver 416 and a transmitting processor 415, wherein the transmitter/receiver 416 comprises an antenna 420. A higher-layer packet arrives at the controller/processor 440; the controller/processor 440 provides header compression and decompression, encryption and decryption, packet segmentation and reordering as well as multiplexing and demultiplexing between a logical channel and a transport channel, so as to implement the L2 layer protocol for the user plane and the control plane. The higher-layer packet may comprise data or control information, such as a DL-SCH or a UL-SCH. The transmitting processor 415 performs various signal transmitting processing functions used for the L1 layer (i.e., PHY), including coding, interleaving, scrambling, modulation, power control/allocation, precoding and physical layer signaling (i.e., synchronization signal, reference signal, etc.) generation. The receiving processor 412 performs various signal receiving processing functions used for the L1 layer (i.e., PHY), including decoding, deinterleaving, demodulation, de-precoding and physical layer signaling extraction. The transmitter 416 is configured to convert a baseband signal provided by the transmitting processor 415 into an RF signal to be transmitted via the antenna 420, and the receiver 416 is configured to convert the RF signal received via the antenna 420 into a baseband signal to be provided to the receiving processor 412.

In Downlink (DL) transmission, a higher-layer packet (for example, the X first-type information blocks in the present disclosure, higher-layer information comprised in the first signaling, the second information block and the third information block) is provided to the controller/processor 440. The controller/processor 440 implements the functionality of the L2 layer. In DL, the controller/processor 440 provides packet compression, encryption, packet segmentation and reordering and multiplexing between a logical channel and a transport channel, as well as radio resources allocation of the first communication node 450 based on various priorities. The controller/processor 440 is also in charge of HARQ operation, a retransmission of a lost packet and a signaling to the first communication node 450, for instance, the X first-type information blocks, the second information block, the third information block and higher-layer information comprised in the first signaling are all generated in the controller/processor 440. The transmitting processor 415 performs various signal processing functions used for the L1 layer (that is, PHY), including coding, interleaving, scrambling, modulation, power control/allocation, precoding and physical layer control signaling generating, which means that the X first-type information blocks, the second information block, the third information block and a physical layer signal of the first signaling are all generated in the transmitting processor 415. Modulated symbols are divided into parallel streams and each of them is mapped into a corresponding multicarrier subcarrier and/or multicarrier symbol. Then the streams are mapped from the transmitting processor 415 to the antenna 420 through the transmitter 416 and transmitted in the form of RF signals. At the receiver side, each receiver 456 receives an RF signal via a corresponding antenna 460, recovers baseband information modulated into the RF carrier and then provides the baseband information to the receiving processor 452. The receiving processor 452 performs various signal receiving processing functions of the L1 layer. The signal receiving processing functions include receiving the X first-type information blocks, the second information block, the third information block and a physical layer signal of the first signaling. Multicarrier symbols in multicarrier symbol streams are demodulated based on varied modulation schemes (i.e., BPSK, QPSK), and are then subjected to descrambling, decoding and deinterleaving so as to recover data or control signals transmitted by the second communication node 410 in a physical channel. After that the data or control signal is provide to the controller/processor 490. The controller/processor 490 implements the functionality of the L2 layer. The controller/processor 490 interprets the X first-type information blocks, the second information block, the third information block and higher-layer information comprised in the first signaling in the present disclosure. The controller/processor 490 can be associated with the memory 480 that stores program codes and data. The memory 480 can be called a computer readable medium.

In Uplink (UL) transmission, the data source 467 or the buffer 480 is configured to provide higher-layer data to the controller/processor 490. The data source 467 or the buffer 480 represents all protocol layers above the L2 layer. The controller/processor 490, based on radio resources allocation of the second communication node 410, provides header compression, encryption, packet segmentation and reordering and a multiplexing between a logical channel and a transport channel, so as to implement the L2 layer protocol for the user plane and the control plane. The controller/processor 490 is also in charge of HARQ operation, a retransmission of a lost packet and a signaling to the second communication node 410. The first radio signal in the present disclosure is generated in the controller/processor 490. The transmitting processor 455 performs various signal transmitting processing functions used for the L1 layer. The signal transmitting processing functions include coding and interleaving so as to promote Forward Error Correction (FEC) at the UE 450 side and also modulation of baseband signals according to each modulation scheme (for example, BPSK, QPSK, etc.). The modulated symbols are divided into parallel streams and each stream is mapped into a corresponding multicarrier subcarrier and/or multicarrier symbol. The symbol streams are later mapped to the antenna 460 via the transmitter 456 and transmitted in the form of RF signals. The receiver 416 receives an RF signal via a corresponding antenna 420; each receiver 416 recovers baseband information modulated onto an RF carrier, and provides the baseband information to the receiving processor 412. The receiving processor 412 performs various signal receiving processing functions used for the L1 layer (that is, PHY), including receiving and processing the physical layer signal of the first radio signal of the present disclosure. The functions also include acquiring multicarrier symbol streams, and then demodulating multicarrier symbols in multicarrier symbol streams based on various modulation schemes (i.e., BPSK, QPSK, etc.), after which the multicarrier symbols are decoded and deinterleaved to recover data and/or control signals originally transmitted by the first communication node 450 in a physical layer channel. The data and/or control signals are later provided to the controller/processor 440. The controller/processor 440 implements the L2 functionality, such as interpretation of information carried by the first radio signal in the present disclosure. The controller/processor 440 may be associated with the buffer 430 that stores program codes and data. The buffer 430 may be computer readable medium.

In one embodiment, the first communication node 450 comprises at least one processor and at least one memory. The at least one memory includes computer program codes. The at least one memory and the computer program codes are configured to be used in collaboration with the at least one processor. The first communication node 450 at least monitors first-type information blocks in a first time window; receives a first signaling; and transmits a first radio signal; herein, the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the first communication node 450 comprises a memory that stores a computer readable instruction program. The computer readable instruction program generates an action when executed by at least one processor. The action includes: monitoring first-type information blocks in a first time window; receiving a first signaling; and transmitting a first radio signal; herein, the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the second communication node 410 comprises at least one processor and at least one memory. The at least one memory includes computer program codes. The at least one memory and the computer program codes are configured to be used in collaboration with the at least one processor. The second communication node 410 at least transmits X first-type information blocks in a first time window; transmits a first signaling; and receives a first radio signal; herein, the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

In one embodiment, the second communication node 410 comprises a memory that stores a computer readable instruction program. The computer readable instruction program generates an action when executed by at least one processor. The action includes: transmitting X first-type information blocks in a first time window; transmitting a first signaling; and receiving a first radio signal; herein, the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

In one embodiment, the receiver 456 (including the antenna 460), the receiving processor 452 and the controller/processor 490 are used for monitoring the first-type information blocks in the present disclosure.

In one embodiment, the receiver 456 (including the antenna 460), the receiving processor 452 and the controller/processor 490 are used for receiving the first signaling in the present disclosure.

In one embodiment, the transmitter 456 (including the antenna 460), the transmitting processor 455 and the controller/processor 490 are used for transmitting the first radio signal in the present disclosure.

In one embodiment, the receiver 456 (including the antenna 460), the receiving processor 452 and the controller/ processor 490 are used for receiving the second information block in the present disclosure.

In one embodiment, the receiver 456 (including the antenna 460), the receiving processor 452 and the controller/processor 490 are used for receiving the third information block in the present disclosure.

In one embodiment, the transmitter 416 (including the antenna 420), the transmitting processor 415 and the controller/processor 440 are used for transmitting the X first-type information blocks in the present disclosure.

In one embodiment, the transmitter 416 (including the antenna 420), the transmitting processor 415 and the controller/processor 440 are used for transmitting the first signaling in the present disclosure.

In one embodiment, the receiver 416 (including the antenna 420), the receiving processor 412 and the controller/processor 440 are used for receiving the first radio signal in the present disclosure.

In one embodiment, the transmitter 416 (including the antenna 420), the transmitting processor 415 and the controller/processor 440 are used for transmitting the second information block in the present disclosure.

In one embodiment, the transmitter 416 (including the antenna 420), the transmitting processor 415 and the controller/processor 440 are used for transmitting the third information block in the present disclosure.

Embodiment 5

Figure 5:
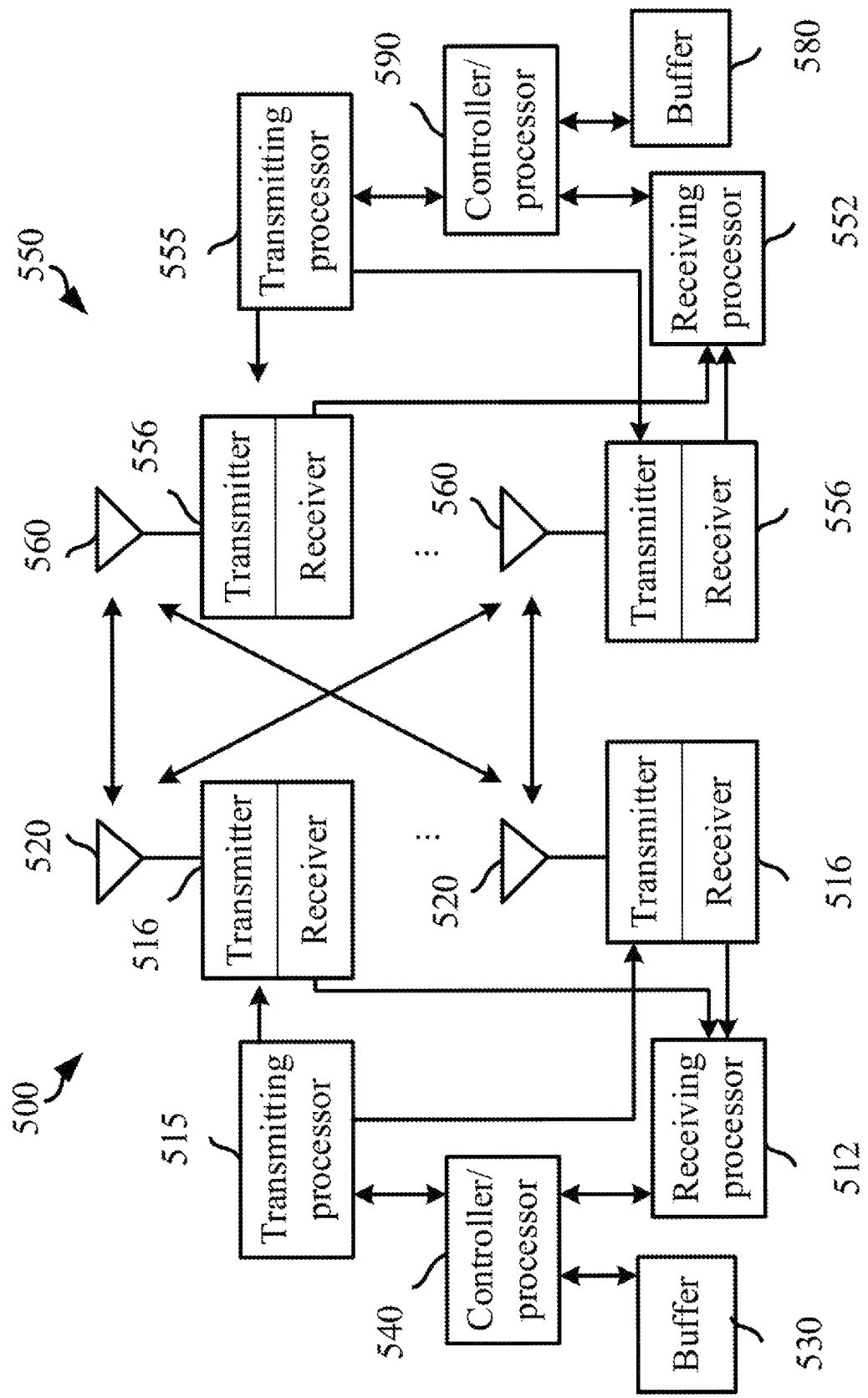
FIG. 5 illustrates a schematic diagram of a first communication node and another UE in communication with each other according to one embodiment of the present disclosure.

Embodiment 5 illustrates a schematic diagram of a first communication node and another UE in communication with each other according to one embodiment of the present disclosure, as shown in FIG. 5.

A first communication node 500 comprises a controller/processor 540, a buffer 530, a receiving processor 512, a transmitter/receiver 516 which comprises an antenna 520 and a transmitting processor 515. The buffer 530 provides a higher-layer packet to the controller/processor 540; the controller/processor 540 provides header compression and decompression, encryption and decryption, packet segmentation and reordering as well as multiplexing and demultiplexing between a logical channel and a transport channel, so as to implement the L2 layer protocols. The higher-layer packet may comprise data or control information, such as an SL-SCH. The transmitting processor 515 performs various signal transmitting processing functions used for the L1 layer (that is, PHY), including coding, interleaving, scrambling, modulation, power control/allocation, precoding and physical layer control signaling generation. The receiving processor 512 performs various signal receiving processing functions used for the L1 layer (i.e., PHY), including decoding, deinterleaving, descrambling, demodulation, de-precoding and extraction of physical layer control signaling. The transmitter 516 is configured to convert a baseband signal provided by the transmitting processor 515 into an RF signal to be transmitted via the antenna 520. The receiver 516 then converts the RF signal received via the antenna 520 into a baseband signal to be provided to the receiving processor 512. The composition of another UE 550 is the same as corresponding composition of the first communication node 500.

In sidelink transmission, a higher-layer packet (for example, X radio signals in the present disclosure) is provided to the controller/processor 540. The controller/processor 540 implements the functionality of the L2 layer. In sidelink transmission, the controller/processor 540 provides header compression, encryption, packet segmentation and reordering and multiplexing between a logical channel and a transport channel. The controller/processor 540 is also in charge of HARQ operation (if available), repeated transmitting, and a signaling to the UE 550. The transmitting processor 515 performs various signal processing functions used for the L1 layer (that is, PHY), including coding, interleaving, scrambling, modulation, power control/allocation, precoding and generation of physical layer control signaling. Physical layer signals of the X radio signals in the present disclosure are generated in the transmitting processor 515. Modulated symbols are then divided into parallel streams and each of them is mapped into a corresponding multicarrier subcarrier and/or multicarrier symbol, and is afterwards mapped from the transmitting processor 515 to the antenna 520 via the transmitter 516 to be transmitted in the form of RF signal. At the receiver side, each receiver 556 receives an RF signal via a corresponding antenna 560, recovers baseband information modulated onto an RF carrier, and provides the baseband information to the receiving processor 552. The receiving processor 552 performs various signal receiving processing functions of the L1 layer, including receiving physical layer signals of the X radio signals in the present disclosure. Multicarrier symbols in multicarrier symbol streams are subjected to demodulation based on various modulation schemes (i.e., BPSK, QPSK), and then to descrambling, decoding and deinterleaving so as to recover data or control signal transmitted by the first communication node 500 in a physical channel. The data and control signal are later provided to the controller/processor 590. The controller/processor 590 implements the functionality of the L2 layer. The controller/processor 590 interprets the X radio signals in the present disclosure. The controller/processor may be associated with the buffer 580 that stores program codes and data. The buffer 580 can be called a computer readable medium.

In one embodiment, the first communication node 500 comprises at least one processor and at least one memory. The at least one memory includes computer program codes. The at least one memory and the computer program codes are configured to be used in collaboration with the at least one processor. The first communication device 500 at least monitors first-type information blocks in a first time window; receives a first signaling; transmits a first radio signal; and transmits X radio signals; herein, the first signaling is used for determining time-frequency resources occupied by the first radio signal; information carried by the first radio signal comprises a first difference, a first reference power value is used for determining the first difference, the first reference power value is a power value for wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value; the X first-type information blocks are used for determining time-frequency resources occupied by the X radio signals, the first reference power value is equal to transmitting power of one of the X radio signals; any of the X radio signals and the first radio signal are transmitted via different air interfaces.

In one embodiment, the first communication node 500 comprises a memory that stores a computer readable instruction program. The computer readable instruction program generates an action when executed by at least one processor. The action includes: monitoring first-type information blocks in a first time window; receiving a first signaling;

transmitting a first radio signal; and transmitting X radio signals; herein, the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value; the X first-type information blocks are used for determining time-frequency resources occupied by the X radio signals, the first reference power value is equal to transmitting power of one of the X radio signals; any of the X radio signals and the first radio signal are transmitted via different air interfaces.

In one embodiment, the receiver 556 (including the antenna 560), the receiving processor 552 and controller/processor 590 are used for receiving the X radio signals in the present disclosure.

In one embodiment, the transmitter 516 (including the antenna 520), the transmitting processor 515 and the controller/processor 540 are used for transmitting the first X radio signals in the present disclosure.

Embodiment 6

Figure 6:
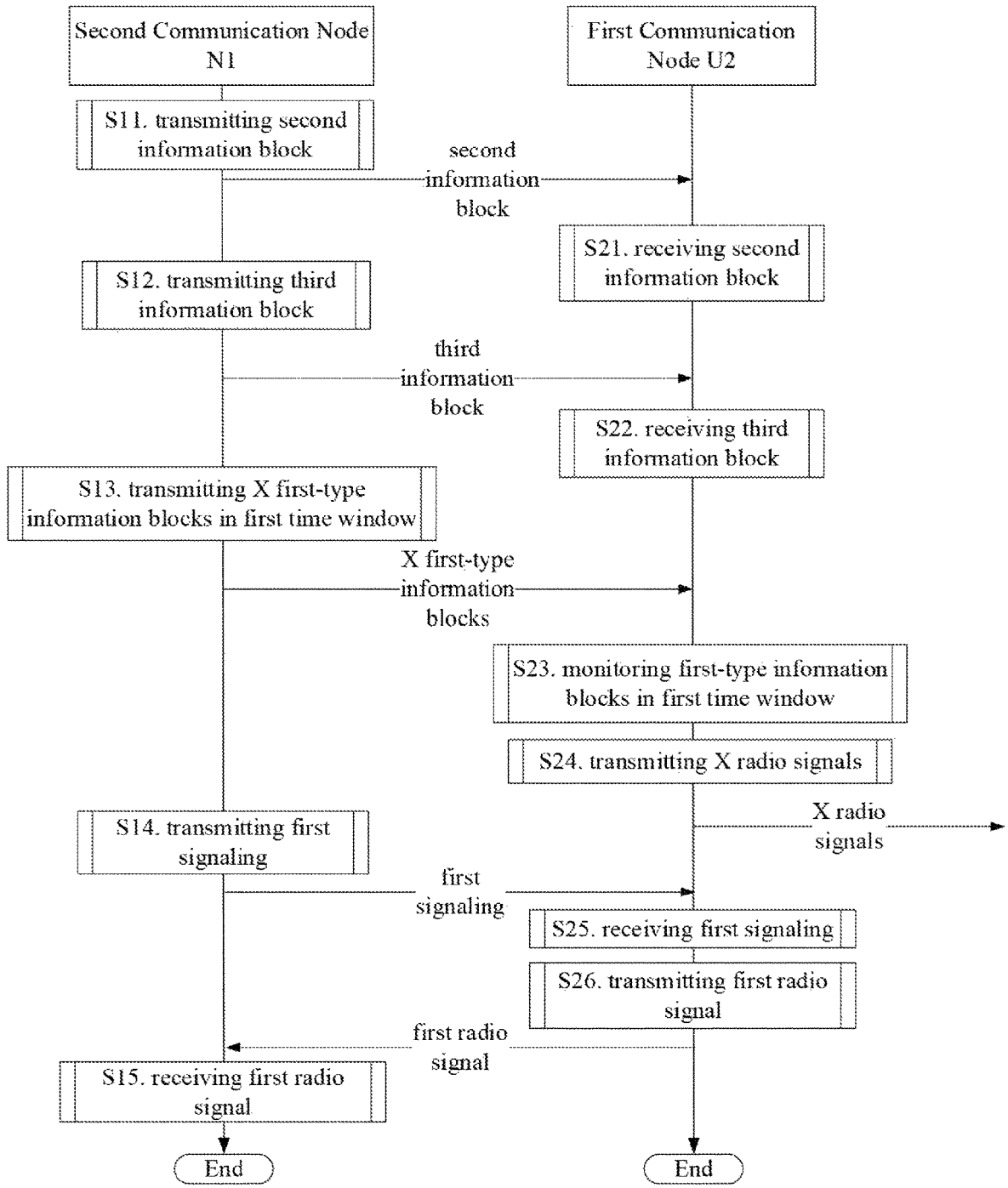
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second communication node N1 is a maintenance base station for a serving cell of a first communication node U2.

The second communication node N1 transmits a second information block in step S11, transmits a third information block in step S12, transmits X first-type information blocks in a first time window in step S13, transmits a first signaling in step S14, and receives a first radio signal in step S15.

The first communication node U2 receives a second information block in step S21, receives a third information block in step S22, monitors first-type information blocks in a first time window in step S23, transmits X radio signals in step S24, receives a first signaling in step S25, and transmits a first radio signal in step S26.

In Embodiment 6, the first signaling in the present disclosure is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value; the second information block is used for determining a first variant; when none of the first-type information blocks is detected in the first time window, the first reference power value is dependent on the first variant; the X first-type information blocks are determining time-frequency resources occupied by the X radio signals respectively, the first reference power value is equal to a transmitting power of one of the X radio signals; any of the X radio signals and the first radio signal are transmitted via different air interfaces; the third information block is used for determining a second variant, the second variant is used for determining a first upper bound, the first difference is equal to a difference between the first upper bound value and the first reference power value.

In one embodiment, the second information block is transmitted via an air interface.

In one embodiment, the second information block is transmitted internally within the first communication node.

In one embodiment, the second information block is transmitted between internal interfaces of the first communication node.

In one embodiment, the second information block is transmitted via a Uu interface.

In one embodiment, the second information block is transmitted via a Pc5 interface.

In one embodiment, the second information block is transmitted between the second communication node of the present disclosure and the first communication node of the present disclosure.

In one embodiment, the second information block is transmitted via a radio interface.

In one embodiment, the second information block is transmitted between a higher layer of the first communication node and a physical layer of the first communication node.

In one embodiment, the second information block comprises physical layer information.

In one embodiment, the second information block comprises higher layer information.

In one embodiment, the second information block is transmitted through a physical layer signaling.

In one embodiment, the second information block is transmitted through a higher layer signaling.

In one embodiment, the second information block comprises all or part of a piece of higher-layer information.

In one embodiment, the second information block comprises all or part of a piece of physical layer information.

In one embodiment, the second information block is transmitted through a Downlink Shared Channel (DL-SCH).

In one embodiment, the second information block is transmitted through a Physical Downlink Shared Channel (PDSCH).

In one embodiment, the second information block is broadcast.

In one embodiment, the second information block is unicast.

In one embodiment, the second information block is groupcast.

In one embodiment, the second information block is cell-specific.

In one embodiment, the second information block is UE-specific.

In one embodiment, the second information block is transmitted through a Physical Downlink Control Channel (PDCCH).

In one embodiment, the second information block comprises all or part of fields of a DCI signaling.

In one embodiment, the second information block comprises all or part of fields of a DCI signaling used for sidelink.

In one embodiment, the second information block comprises all or part of fields of DCI Format 3 in 3GPP TS36.212 (v15.4.0).

In one embodiment, the second information block comprises all or part of fields of DCI Format 4 in 3GPP TS38.212.

In one embodiment, the above phrase that the second information block is used for determining a first variant includes the meaning that the second information block is used by the first communication node for determining the first variant.

In one embodiment, the above phrase that the second information block is used for determining a first variant includes the meaning that the second information block is used for directly indicating the first variant.

In one embodiment, the above phrase that the second information block is used for determining a first variant includes the meaning that the second information block is used for indirectly indicating the first variant.

In one embodiment, the above phrase that the second information block is used for determining a first variant includes the meaning that the second information block is used for explicitly indicating the first variant.

In one embodiment, the above phrase that the second information block is used for determining a first variant includes the meaning that the second information block is used for implicitly indicating the first variant.

In one embodiment, the first variant is equal to a target receiving power value for sidelink.

In one embodiment, the first variant is $P_0$ on sidelink.

In one embodiment, the first variant is $P_{0\_PSSCH}$.

In one embodiment, the first variant is $P_{0\_PSCCH}$.

In one embodiment, the first variant is $P_{0\_PSFCH}$.

In one embodiment, the first variant is $P_0(j)$ on sidelink, wherein $j \in \{0, 1, \ldots, J-1\}$.

In one embodiment, the first variant is $P_{0\_PSSCH}(j)$ on sidelink, wherein $j \in \{0, 1, \ldots, J-1\}$.

In one embodiment, the first variant is $P_{0\_PSCCH}(j)$, wherein $j \in \{0, 1, \ldots, J-1\}$.

In one embodiment, the first variant is $P_{0\_PSFCH}(j)$, wherein $j \in \{0, 1, \ldots, J-1\}$.

In one embodiment, the first variant is equal to a fallback/default value of target receiving power of sidelink.

In one embodiment, the first variant is a fallback/default value of $P_0$ on sidelink.

In one embodiment, the first variant is a fallback/default value of $P_{0\_PSSCH}$.

In one embodiment, the first variant is a fallback/default value of $P_{0\_PSCCH}$.

In one embodiment, the first variant is a fallback/default value of $P_{0\_PSFCH}$.

In one embodiment, the first variant is $P_0(0)$ on sidelink.

In one embodiment, the first variant is $P_0(0)$ on uplink.

In one embodiment, the first variant is $P_{0\_PUSCH,b,f,c}(0)$ in 3GPP TS38.213 (v15.4.0), section 7.1.1.

In one embodiment, the first variant is $P_{0\_PSSCH}(0)$.

In one embodiment, the first variant is $P_{0\_PSCCH}(0)$.

In one embodiment, the first variant is $P_{0\_PSFCH}(0)$.

In one embodiment, the first variant is a PL compensation factor on sidelink.

In one embodiment, the first variant is $\alpha(j)$ in power control on sidelink, wherein $j \in \{0, 1, \ldots, J-1\}$.

In one embodiment, the first variant is equal to a fallback/default value of a PL compensation factor on sidelink.

In one embodiment, the first variant is a fallback/default value of $\alpha(j)$ in power control on sidelink, wherein $j \in \{0, 1, \ldots, J-1\}$.

In one embodiment, the first variant is $\alpha(0)$ in power control on uplink.

In one embodiment, the first variant is a fallback/default value of $\alpha(j)$ in power control on uplink, wherein $j \in \{0, 1, \ldots, J-1\}$.

In one embodiment, the first variant is a value of $\alpha(j)$ in Power Headroom (PH) calculation based on reference to PUSCH in 3GPP TS38.213 (v15.4.0), section 7.7.1.

In one embodiment, the above phrase that the first reference power value is dependent on the first variant includes the meaning that the first reference power value is linearly correlated to the first variant.

In one embodiment, the above phrase that the first reference power value is dependent on the first variant includes the meaning that there is a positively linear correlation between the first reference power value and the first variant.

In one embodiment, the above phrase that the first reference power value is dependent on the first variant includes the meaning that there is a negatively linear correlation between the first reference power value and the first variant.

In one embodiment, the above phrase that the first reference power value is dependent on the first variant includes the meaning that the first reference power value is measured by dBm, the first variant is measured by dBm, and the first reference power value is linearly correlated to the first variant.

In one embodiment, the above phrase that the first reference power value is dependent on the first variant includes the meaning that the first reference power value is measured by dBm, the first variant is measured by dB, and the first reference power value is linearly correlated to the first variant.

In one embodiment, the above phrase that the first reference power value is dependent on the first variant includes the meaning that the first variant is used for determining the first reference power value.

In one embodiment, the above phrase that the first reference power value is dependent on the first variant includes the meaning that the first variant is used for calculating the first reference power value.

In one embodiment, the above phrase that the first reference power value is dependent on the first variant includes the meaning that when the first reference power value is a transmitting power value estimated for a virtual sidelink transmission, the first variant is used for calculating a fallback/default value of the first reference power value.

Embodiment 7

Figure 7:
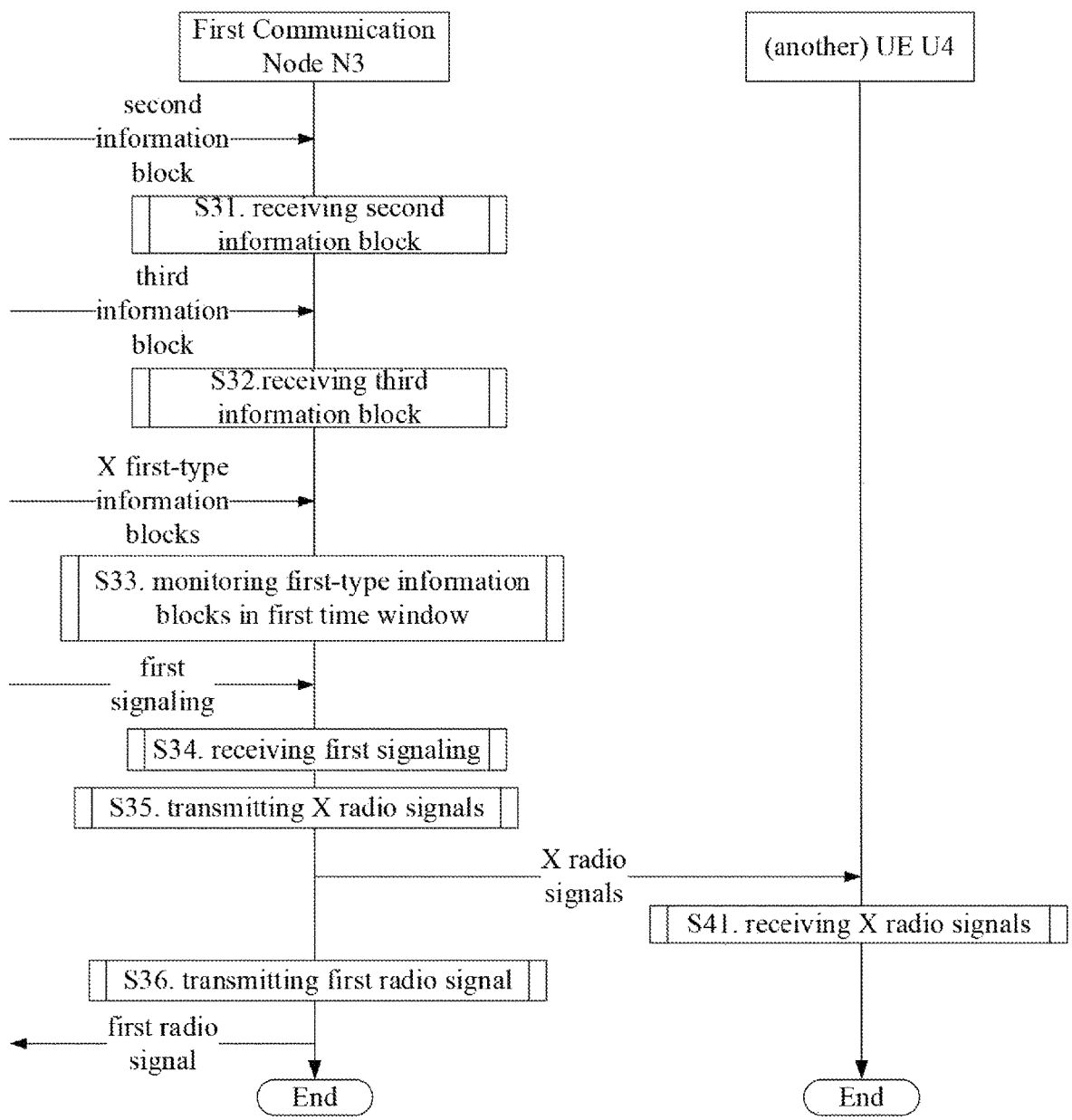
FIG. 7 illustrates a flowchart of radio signal transmission according to another embodiment of the present disclosure.

Embodiment 7 illustrates a flowchart of radio signal transmission according to another embodiment of the present disclosure, as shown in FIG. 7. In FIG. 7, a first communication node N3 is in communication with another UE U4.

The first communication node N3 receives a second information block in step S31, receives a third information block in step S32, monitors first-type information blocks in a first time window in step S33, receives a first signaling in step S34, transmits X radio signals in step S35, and transmits a first radio signal in step S36.

The UE U4 receives X radio signals in step S41.

In Embodiment 7, the first signaling in the present disclosure is used for determining time-frequency resources occupied by the first radio signal in the present disclosure; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value; the second information block is used for determining a first variant; when none of the first-type information blocks is detected in the first time window, the first reference power value is dependent on the first variant; the X first-type information blocks are used for determining time-frequency resources occupied by the X radio signals respectively, the first reference power value is equal to transmitting power of one of the X radio signals; any of the X radio signals and the first radio signal are transmitted via different air interfaces; the third information block is used for determining a second variant, the second variant is used for determining a first upper bound value, the first difference is equal to a difference between the first upper bound value and the first reference power value.

In one embodiment, the third information block is transmitted via an air interface.

In one embodiment, the third information block is transmitted internally within the first communication node.

In one embodiment, the third information block is transmitted between internal interfaces of the first communication node.

In one embodiment, the third information block is transmitted via a Uu interface.

In one embodiment, the third information block is transmitted via a Pc5 interface.

In one embodiment, the third information block is transmitted between the second communication node of the present disclosure and the first communication node of the present disclosure.

In one embodiment, the third information block is transmitted via a radio interface.

In one embodiment, the third information block is transmitted between a higher layer of the first communication node and a physical layer of the first communication node.

In one embodiment, the third information block comprises physical layer information.

In one embodiment, the third information block comprises higher layer information.

In one embodiment, the third information block is transmitted through a physical layer signaling.

In one embodiment, the third information block is transmitted through a higher layer signaling.

In one embodiment, the third information block comprises all or part of a piece of higher-layer information.

In one embodiment, the third information block comprises all or part of a piece of physical layer information.

In one embodiment, the third information block is transmitted through a DL-SCH.

In one embodiment, the third information block is transmitted through a PDSCH.

In one embodiment, the third information block is broadcast.

In one embodiment, the third information block is unicast.

In one embodiment, the third information block is groupcast.

In one embodiment, the third information block is cell-specific.

In one embodiment, the third information block is UE-specific.

In one embodiment, the third information block is transmitted through a PDCCH.

In one embodiment, the third information block comprises all or part of fields of a DCI signaling.

In one embodiment, the third information block comprises all or part of fields of DCI Format 3 in 3GPP TS36.212 (v15.4.0).

In one embodiment, the third information block comprises all or part of fields of DCI Format 4 in 3GPP TS38.212.

In one embodiment, the above phrase that the third information block is used for determining a second variant includes the meaning that the third information block is used by the first communication node of the present disclosure for determining the second variant.

In one embodiment, the above phrase that the third information block is used for determining a second variant includes the meaning that the third information block is used for directly indicating the second variant.

In one embodiment, the above phrase that the third information block is used for determining a second variant includes the meaning that the third information block is used for indirectly indicating the second variant.

In one embodiment, the above phrase that the third information block is used for determining a second variant includes the meaning that the third information block is used for explicitly indicating the second variant.

In one embodiment, the above phrase that the third information block is used for determining a second variant includes the meaning that the third information block is used for implicitly indicating the second variant.

In one embodiment, the second variant is Channel Busy Ratio (CBR).

In one embodiment, the second variant is Channel Occupancy Ratio (CR).

In one embodiment, the second variant is "P-Max" in 3GPP TS38.101 (v15.4.0), section 6.2.4.

In one embodiment, the second variant is "$MPR_c$" in 3GPP TS38.101 (v15.4.0), section 6.2.4.

In one embodiment, the second variant is "$A\text{-}MPR_c$" in 3GPP TS38.101 (v15.4.0), section 6.2.4.

In one embodiment, the second variant is $P_{0\_PUSCH,b,f,c}(j)$ for calculating the transmitting power of the first radio signal in the present disclosure.

In one embodiment, the second variant is $P_{0\_NOMINAL\_PUSCH,f,c}(j)$ for calculating the transmitting power of the first radio signal in the present disclosure.

In one embodiment, the second variant is $P_{0\_UE\_PUSCH,b,f,c}(j)$ for calculating the transmitting power of the first radio signal in the present disclosure.

In one embodiment, the second variant is $\alpha_{b,f,c}(j)$ for calculating the transmitting power of the first radio signal in the present disclosure.

In one embodiment, the second variant is used for determining transmitting power of the first radio signal.

In one embodiment, the first upper bound value is an upper bound of transmitting power of the first communication of the present disclosure when transmitting a radio signal on sidelink.

In one embodiment, the first upper bound value is a maximum value of possible transmitting power of the first communication of the present disclosure when transmitting a radio signal on sidelink.

In one embodiment, the first upper bound value is equal to transmitting power of the first radio signal.

In one embodiment, the first upper bound value is equal to transmitting power of the first communication node when transmitting a radio signal on uplink.

In one embodiment, the first upper bound value is equal to transmitting power of the first communication node when transmitting a radio signal on uplink with a given MCS and occupied time-frequency resources.

In one embodiment, the first upper bound value is equal to $P_{CMAX,f,c}(i)$ in 3GPP TS38.213 (v15.4.0).

In one embodiment, the first upper bound value is equal to $\tilde{P}_{CMAX,f,c}(i)$ in 3GPP TS38.213 (v15.4.0), section 7.7.1.

In one embodiment, the first upper bound value is equal to $P_{MAX\_CBR}$.

Embodiment 8

Figure 8:
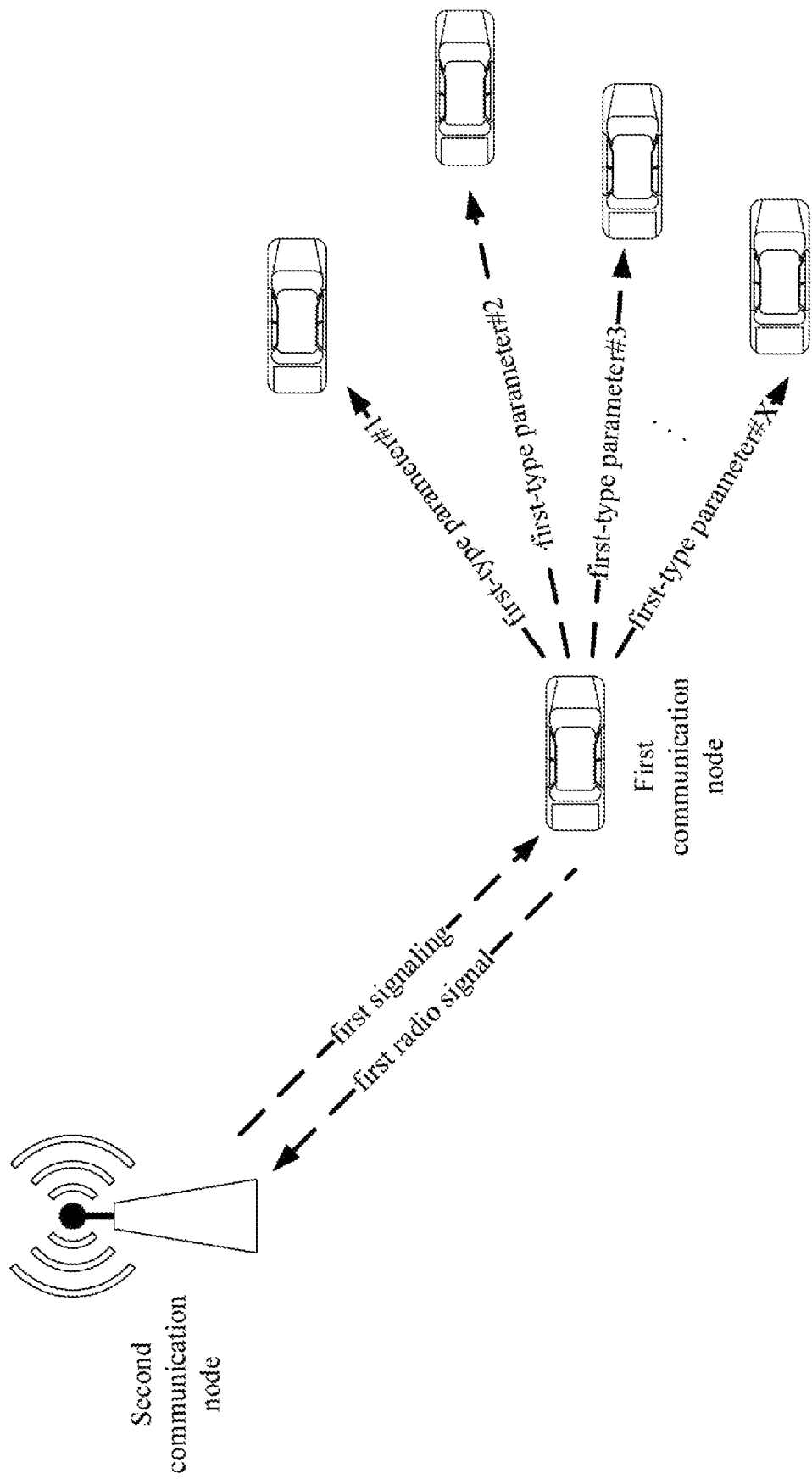
FIG. 8 illustrates a schematic diagram of X first-type parameters according to one embodiment of the present disclosure.

Embodiment 8 illustrates a schematic diagram of X first-type parameters according to one embodiment of the present disclosure, as shown in FIG. 8. In FIG. 8, a first communication node represents a vehicle-mounted user equipment (vehicle-mounted communication unit), while a second communication node represents a base station (gNB or eNB); each broken line with an arrow represents a parameter or a signal.

In Embodiment 8, information carried by the first radio signal in the present disclosure comprises a first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, any of the X first-type parameters is a time value.

In one embodiment, any of the X first-type parameters is a time interval length value.

In one embodiment, any of the X first-type parameters is an index of a temporal position in time domain.

In one embodiment, any of the X first-type parameters is an order of a time position in time domain.

In one embodiment, any of the X first-type parameters is measured by ms.

In one embodiment, any of the X first-type parameters is measured by μs.

In one embodiment, any of the X first-type parameters is an index of a multicarrier symbol.

In one embodiment, any of the X first-type parameters is a pathloss value.

In one embodiment, any of the X first-type parameters is measured by dB.

In one embodiment, any of the X first-type parameters is a power value.

In one embodiment, any of the X first-type parameters is measured by mW.

In one embodiment, any of the X first-type parameters is measured by dBm.

In one embodiment, any of the X first-type parameters is measured by W.

In one embodiment, any two of the X first-type parameters are for different sidelinks.

In one embodiment, there are two of the X first-type parameters for the same sidelink.

Embodiment 9

Figure 9:
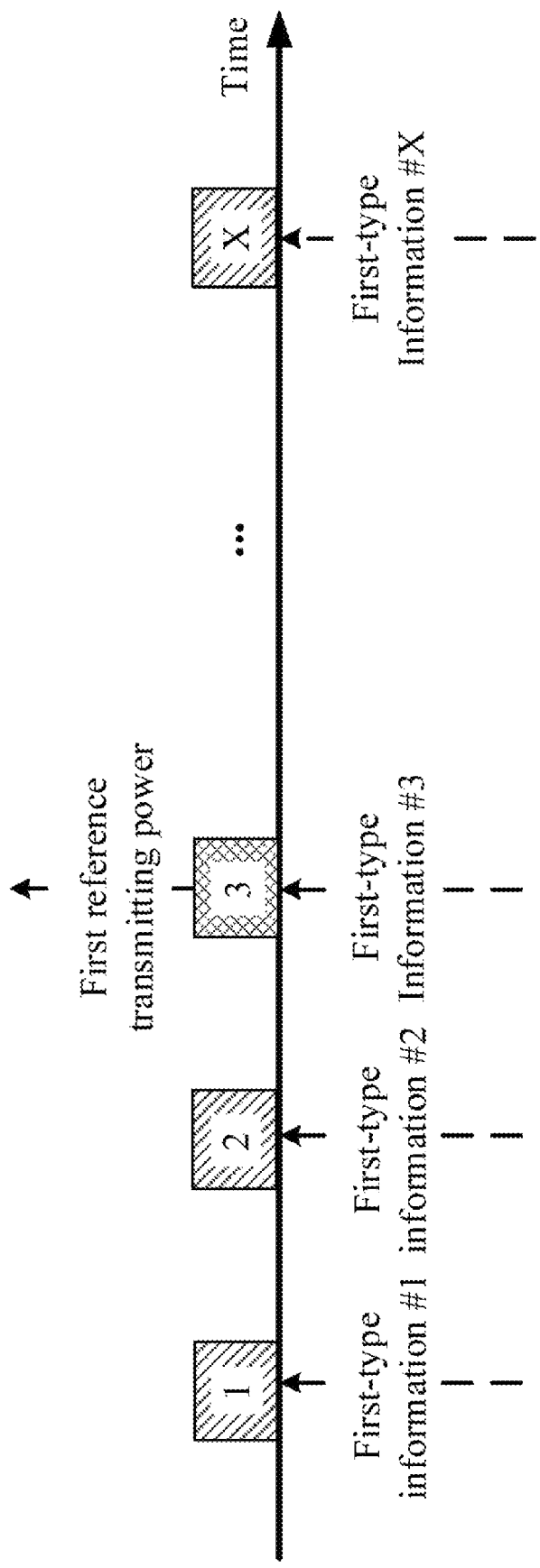
FIG. 9 illustrates a schematic diagram of relations between X radio signals and a first reference power value according to one embodiment of the present disclosure.

Embodiment 9 illustrates a schematic diagram of relations between X radio signals and a first reference power value according to one embodiment of the present disclosure, as shown in FIG. 9. In FIG. 9, the horizontal axis represents time, each rectangle filled with slashes represents one of the X radio signals other than a radio signal employing a first reference power value, and each rectangle filled with crosses represents a radio signal employing a first reference power value out of the X radio signals.

In Embodiment 9, the X first-type information blocks in the present disclosure are used for determining time-frequency resources occupied by the X radio signals respectively, the first reference power value in the present disclosure is equal to a transmitting power of one of the X radio signals; any of the X radio signals and the first radio signal are transmitted via different air interfaces.

In one embodiment, any of the X radio signals is transmitted through a Sidelink Shared Channel (SL-SCH).

In one embodiment, any of the X radio signals is transmitted via sidelink.

In one embodiment, any of the X radio signals is transmitted via a PC5 interface.

In one embodiment, any of the X radio signals is unicast.

In one embodiment, any of the X radio signals is groupcast.

In one embodiment, any of the X radio signals is broadcast.

In one embodiment, any of the X radio signals is transmitted through a Physical Sidelink Shared Channel (PSSCH).

In one embodiment, any of the X radio signals is transmitted through a Physical Sidelink Control Channel (PSCCH).

In one embodiment, any of the X radio signals is transmitted through a Physical Sidelink Feedback Channel (PSCCH).

In one embodiment, there exist two radio signals having a same target receive among the X radio signals.

In one embodiment, any two of the X radio signals have different target receivers.

In one embodiment, the above phrase that the X first-type information blocks are used for determining time-frequency resources occupied by the X radio signals respectively includes the meaning that the X first-type information blocks are used by the first communication node for determining time-frequency resources occupied by the X radio signals respectively.

In one embodiment, the above phrase that the X first-type information blocks are used for determining time-frequency resources occupied by the X radio signals respectively includes the meaning that the X first-type information blocks are used for directly indicating time-frequency resources occupied by the X radio signals respectively.

In one embodiment, the above phrase that the X first-type information blocks are used for determining time-frequency resources occupied by the X radio signals respectively includes the meaning that the X first-type information blocks are used for indirectly indicating time-frequency resources occupied by the X radio signals respectively.

In one embodiment, the above phrase that the X first-type information blocks are used for determining time-frequency resources occupied by the X radio signals respectively includes the meaning that the X first-type information blocks are used for explicitly indicating time-frequency resources occupied by the X radio signals respectively.

In one embodiment, the above phrase that the X first-type information blocks are used for determining time-frequency resources occupied by the X radio signals respectively includes the meaning that the X first-type information blocks are used for implicitly indicating time-frequency resources occupied by the X radio signals respectively.

In one embodiment, the X first-type information blocks are also respectively used for determining MCSs employed by the X radio signals.

In one embodiment, the X first-type information blocks are also respectively used for determining RVs employed by the X radio signals.

In one embodiment, the X first-type information blocks are also respectively used for determining whether the X radio signals are transmitted for the first time.

In one embodiment, the X first-type information blocks are also respectively used for determining the HARQ process that the X radio signals belong to.

In one embodiment, the first reference power value is equal to a transmitting power value of one of the X radio signals with the greatest transmitting power.

In one embodiment, the first reference power value is equal to a transmitting power value of one of the X radio signals with the smallest transmitting power.

In one embodiment, time-frequency resources occupied by any of the X radio signals are orthogonal with time-frequency resources occupied by the first radio signal.

In one embodiment, time-frequency resources occupied by any of the X radio signals and time-frequency resources occupied by the first radio signal are non-overlapped.

In one embodiment, the above phrase that any of the X radio signals and the first radio signal are transmitted via different air interfaces includes the meaning that the first radio signal is transmitted via a Uu interface, while any of the X radio signals is transmitted via an air interface other than the Uu interface.

In one embodiment, the above phrase that any of the X radio signals and the first radio signal are transmitted via different air interfaces includes the meaning that the first radio signal is transmitted via a Pc5 interface, while any of the X radio signals is transmitted via an air interface other than the Pc5 interface.

In one embodiment, the above phrase that any of the X radio signals and the first radio signal are transmitted via different air interfaces includes the meaning that the first radio signal is transmitted via an interface between the first communication node and a base station (gNB, eNB), while any of the X radio signals is transmitted via an air interface between the first communication node and another UE.

In one embodiment, the above phrase that any of the X radio signals and the first radio signal are transmitted via different air interfaces includes the meaning that the first radio signal is transmitted via a Uu interface, while any of the X radio signals is transmitted via a Pc5 interface.

In one embodiment, the above phrase that any of the X radio signals and the first radio signal are transmitted via different air interfaces includes the meaning that a target receiver of the first radio signal is different from a target receiver of any of the X radio signals.

In one embodiment, the above phrase that any of the X radio signals and the first radio signal are transmitted via different air interfaces includes the meaning that a target receiver of the first radio signal and a target receiver of any of the X radio signals are of different types.

In one embodiment, the above phrase that any of the X radio signals and the first radio signal are transmitted via different air interfaces includes the meaning that a target receiver of the first radio signal is a base station (gNB, eNB), while a target receiver of any of the X radio signals is a UE.

In one embodiment, a carrier to which frequency domain resources occupied by any of the X radio signals belong is the same as a carrier to which frequency domain resources occupied by the first radio signal.

In one embodiment, a New Radio Absolute Radio Frequency Channel Number (NR-ARFCN) of a carrier to which frequency domain resources occupied by any of the X radio signals is the same as that of a carrier to which frequency domain resources occupied by the first radio signal.

Embodiment 10

Embodiment 10 illustrates a schematic diagram of relation between a first indicator and a first difference according to one embodiment of the present disclosure, as shown in FIG. 10. In FIG. 10, each rectangular box represents a field or a subheader in a MAC layer signaling. Bytes in the figure are presumed to be aligned.

In Embodiment 10, information carried by the first radio signal in the present disclosure comprises a first indicator, the first indicator is used for indicating that the first difference in the present disclosure is for sidelink, or the first indicator is used for indicating that the first difference is for uplink.

In one embodiment, the first indicator is transmitted through a higher-layer signaling.

In one embodiment, the first indicator is transmitted through a MAC layer signaling.

In one embodiment, the first indicator is transmitted through a MAC CE of a MAC layer.

In one embodiment, the first indicator is transmitted through a MAC Header of a MAC layer.

In one embodiment, the first indicator is transmitted through a MAC Subheader of a MAC layer.

In one embodiment, the first indicator belongs to a Protocol Data Unit (MAC PDU).

In one embodiment, the first indicator belongs to a Service Data Unit (MAC SDU).

In one embodiment, the above phrase that the first indicator is used for indicating that the first difference is for sidelink, or the first indicator is used for indicating that the first difference is for uplink includes the following meaning: the first indicator is used for directly indicating that the first difference is for sidelink, or the first indicator is used for directly indicating that the first difference is for uplink.

In one embodiment, the above phrase that the first indicator is used for indicating that the first difference is for sidelink, or the first indicator is used for indicating that the first difference is for uplink includes the following meaning: the first indicator is used for indirectly indicating that the first difference is for sidelink, or the first indicator is used for indirectly indicating that the first difference is for uplink.

In one embodiment, the above phrase that the first indicator is used for indicating that the first difference is for sidelink, or the first indicator is used for indicating that the first difference is for uplink includes the following meaning: the first indicator is used for explicitly indicating that the first difference is for sidelink, or the first indicator is used for explicitly indicating that the first difference is for uplink.

In one embodiment, the above phrase that the first indicator is used for indicating that the first difference is for sidelink, or the first indicator is used for indicating that the first difference is for uplink includes the following meaning: the first indicator is used for implicitly indicating that the first difference is for sidelink, or the first indicator is used for implicitly indicating that the first difference is for uplink.

Embodiment 11

Figure 11:
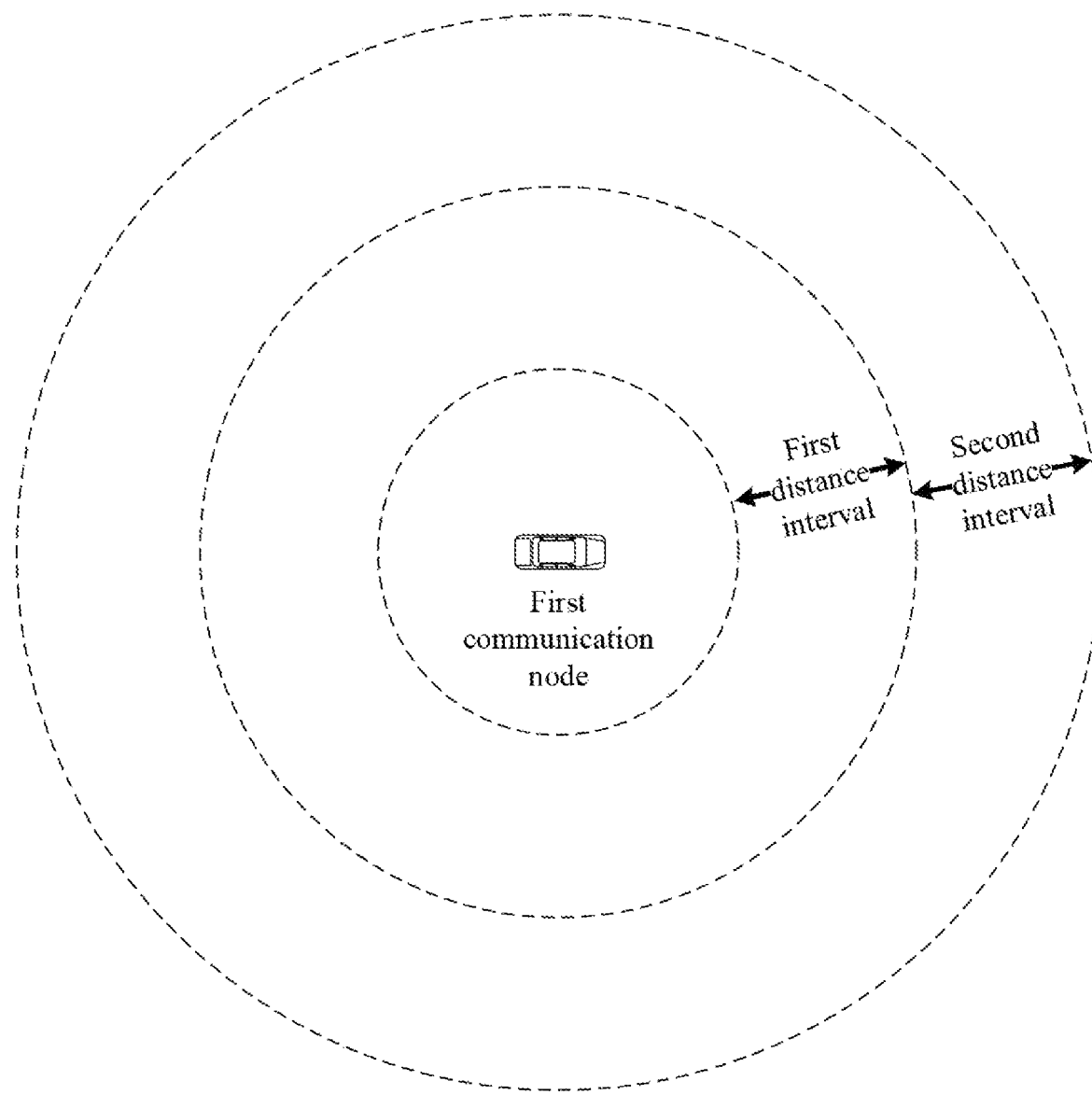
FIG. 11 illustrates a schematic diagram of relation between a first distance interval and a second distance interval according to one embodiment of the present disclosure.

Embodiment 11 illustrates a schematic diagram of relation between a first distance interval and a second distance interval according to one embodiment of the present disclosure, as shown in FIG. 11. In FIG. 11, each annular interval represents a distance interval.

In Embodiment 11, information carried by the first radio signal in the present disclosure comprises a second difference, the first difference and the second difference respectively correspond to a first distance interval and a second distance interval, the first distance interval and the second distance interval are orthogonal.

In one embodiment, the second difference is PH.

In one embodiment, the second difference is a rational number.

In one embodiment, the second difference is positive.

In one embodiment, the second difference is negative.

In one embodiment, the second difference is equal to 0.

In one embodiment, the second difference is measured by mW.

In one embodiment, the second difference is measured by dB.

In one embodiment, the second difference is measured by dBm.

In one embodiment, the first distance interval includes a distance range.

In one embodiment, the second distance interval includes a distance range.

In one embodiment, the first distance interval is an interval covering a distance to the first communication node in the present disclosure.

In one embodiment, the second distance interval is an interval covering a distance to the first communication node in the present disclosure.

In one embodiment, the above phrase that the first distance interval and the second distance interval are orthogonal includes the meaning that there does not exist a distance value belonging to the first distance interval and the second distance interval simultaneously.

In one embodiment, the above phrase that the first distance interval and the second distance interval are orthogonal includes the meaning that the first distance interval and the second distance interval are non-overlapped.

In one embodiment, the first distance interval is a non-empty set.

In one embodiment, the second distance interval is a non-empty set.

In one embodiment, the phrase that the first difference and the second difference respectively correspond to a first distance interval and a second distance interval includes the meaning that the first difference and the second difference are respectively applied for the first distance interval and the second distance interval.

In one embodiment, the phrase that the first difference and the second difference respectively correspond to a first distance interval and a second distance interval includes the meaning that the first difference and the second difference are respectively applied for scheduling on sidelinks of target receivers within the first distance interval and the second distance interval.

In one embodiment, the phrase that the first difference and the second difference respectively correspond to a first distance interval and a second distance interval includes the meaning that the first difference and the second difference are respectively calculated based on sidelinks of target receivers within the first distance interval and the second distance interval.

In one embodiment, the phrase that the first difference and the second difference respectively correspond to a first distance interval and a second distance interval includes the meaning that the first difference and the second difference are respectively calculated based on parameters of target receivers within the first distance interval and the second distance interval.

In one embodiment, the phrase that the first difference and the second difference respectively correspond to a first distance interval and a second distance interval includes the meaning that the first difference and the second difference are respectively calculated based on parameters specific to the first distance interval and parameters specific to the second distance interval.

Embodiment 12

Figure 12:
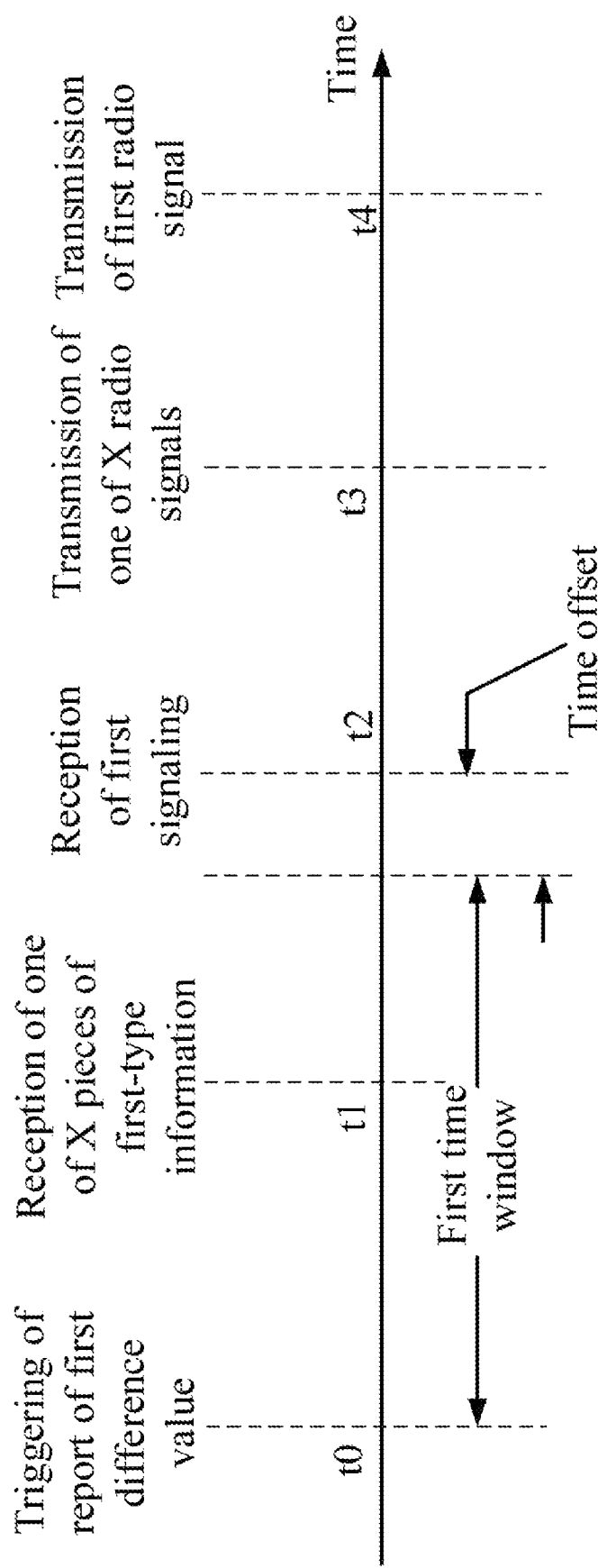
FIG. 12 illustrates a schematic diagram of a first time window according to one embodiment of the present disclosure.

Embodiment 12 illustrates a schematic diagram of a first time window according to one embodiment of the present disclosure, as shown in FIG. 12. In FIG. 12, the horizontal axis represents time. Each vertical broken line represents a point of time; t0 refers to triggering time of report of a first difference, t1 refers to receiving time of one of X pieces of first-type information, t2 is receiving time of a first signaling, t3 is transmitting time of one of X radio signals, and t4 refers to transmitting time of a first radio signal.

In Embodiment 12, an end of the first time window in the present disclosure is related to a receiving time of the first signaling in the present disclosure, and a start of the first time window in the present disclosure is related to a triggering time of the report of the first difference in the present disclosure.

In one embodiment, receiving time of the first signaling includes a start time of reception of the first signaling.

In one embodiment, receiving time of the first signaling includes an end time of reception of the first signaling.

In one embodiment, the above phrase that an end of the first time window is related to receiving time of the first signaling includes the meaning that the end of the first time window is a start time of reception of the first signaling.

In one embodiment, the above phrase that an end of the first time window is related to receiving time of the first signaling includes the meaning that the end of the first time window is an end time of reception of the first signaling.

In one embodiment, the above phrase that an end of the first time window is related to receiving time of the first signaling includes the meaning that the end of the first time window is no later than an end time of reception of the first signaling.

In one embodiment, the above phrase that an end of the first time window is related to receiving time of the first signaling includes the meaning that the end of the first time window is no later than a start time of reception of the first signaling.

In one embodiment, the above phrase that an end of the first time window is related to receiving time of the first signaling includes the meaning that the end of the first time window is later than an end time of reception of the first signaling.

In one embodiment, the above phrase that an end of the first time window is related to receiving time of the first signaling includes the meaning that the end of the first time window is later than a start time of reception of the first signaling.

In one embodiment, the above phrase that an end of the first time window is related to receiving time of the first signaling includes the meaning that the end of the first time window is earlier than the receiving time of the first signaling by X ms; the X is pre-defined, or the X is configurable, or the X is related to a subcarrier spacing (SCS) of subcarriers occupied by the first radio signal.

In one embodiment, the above phrase that an end of the first time window is related to receiving time of the first signaling includes the meaning that the end of the first time window is earlier than the receiving time of the first signaling by Y ms; the Y is pre-defined, or the Y is configurable, or the Y is related to an SCS of subcarriers occupied by the first radio signal.

In one embodiment, the above phrase that an end of the first time window is related to receiving time of the first signaling includes the meaning that the end of the first time window is later than the receiving time of the first signaling by X ms; the X is pre-defined, or the X is configurable, or the X is related to an SCS of subcarriers occupied by the first radio signal.

In one embodiment, the above phrase that an end of the first time window is related to receiving time of the first signaling includes the meaning that the end of the first time window is later than the receiving time of the first signaling by Y ms; the Y is pre-defined, or the Y is configurable, or the Y is related to an SCS of subcarriers occupied by the first radio signal.

In one embodiment, the triggering time of report of the first difference is decided on the higher layer of the first communication node.

In one embodiment, the triggering time of report of the first difference is decided on the MAC layer of the first communication node.

In one embodiment, the triggering time of report of the first difference is decided on the physical layer of the first communication node.

In one embodiment, the triggering time of report of the first difference is decided by a triggering event targeting the report of the first difference.

In one embodiment, the triggering time of report of the first difference refers to the time when the decision of transmitting the report of the first difference is transmitted by the first communication node.

In one embodiment, the triggering time of report of the first difference refers to the time when the first communication node meets the triggering condition of transmitting the report of the first difference.

In one embodiment, the above phrase that a start of the first time window is related to triggering time of a report of the first difference includes the meaning that the start of the first time window is the triggering time of a report of the first difference.

In one embodiment, the above phrase that a start of the first time window is related to triggering time of a report of the first difference includes the meaning that the start of the first time window is earlier than the triggering time of a report of the first difference.

In one embodiment, the above phrase that a start of the first time window is related to triggering time of a report of the first difference includes the meaning that the start of the first time window is later than the triggering time of a report of the first difference.

In one embodiment, the above phrase that a start of the first time window is related to triggering time of a report of the first difference includes the meaning that the start of the first time window is later than the triggering time of a report of the first difference by X ms; the X is pre-defined, or the X is configurable, or the X is related to a subcarrier spacing (SCS) of subcarriers occupied by radio signals carrying first-type information blocks.

In one embodiment, the above phrase that a start of the first time window is related to triggering time of a report of the first difference includes the meaning that the start of the first time window is earlier than the triggering time of a report of the first difference by Y ms; the Y is pre-defined, or the Y is configurable, or the Y is related to an SCS of subcarriers occupied by radio signals carrying first-type information blocks.

Embodiment 13

Figure 13:
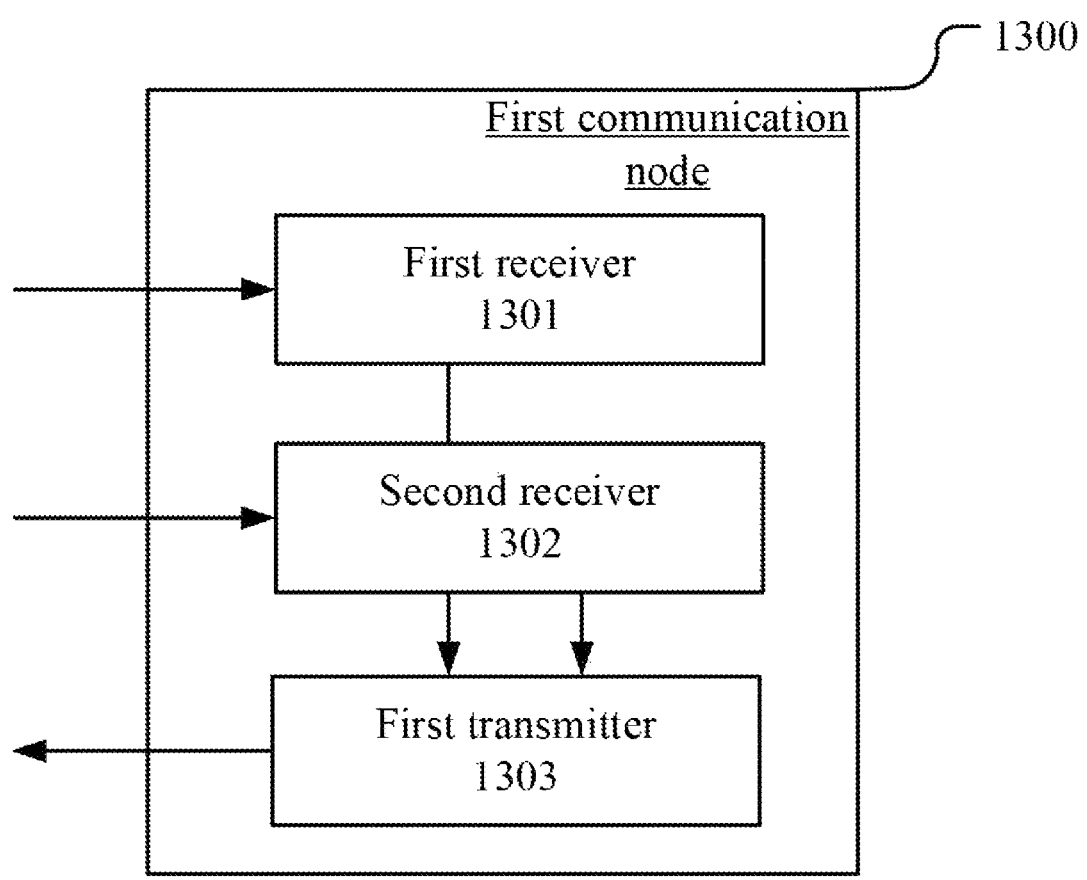
FIG. 13 illustrates a structure block diagram of a processing device in a first communication node according to one embodiment of the present disclosure.

Embodiment 13 illustrates a structure block diagram of a processing device in a first communication node according to one embodiment, as shown in FIG. 13. In FIG. 13, a first communication node 1300 comprises a first receiver 1301, a second receiver 1302 and a first transmitter 1303. The first receiver 1301 comprises the transmitter/receiver 456 (including the antenna 460), the receiving processor 452 and the controller/processor 490 in FIG. 4 of the present disclosure; or the first receiver 1301 comprises the transmitter/receiver 516 (including the antenna 520), the receiving processor 512 and the controller/processor 540 in FIG. 5 of the present disclosure; the second receiver 1302 comprises the transmitter/receiver 456 (including the antenna 460), the receiving processor 452 and the controller/processor 490 in FIG. 4 of the present disclosure; or the second receiver 1302 comprises the transmitter/receiver 516 (including the antenna 520), the receiving processor 512 and the controller/processor 540 in FIG. 5 of the present disclosure; the first transmitter 1303 comprises the transmitter/receiver 456 (including the antenna 460), the transmitting processor 455 and the controller/processor 490 in FIG. 4 of the present disclosure; or the first transmitter 1303 comprises the transmitter/receiver 516 (including the antenna 520), the transmitting processor 515 and the controller/processor 540 in FIG. 5 of the present disclosure.

In Embodiment 13, the first receiver 1301 monitors first-type information blocks in a first time window; the second receiver 1302 receives a first signaling; the first transmitter 1303 transmits a first radio signal; the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the first receiver 1301 also receives second information block; the second information block is used for determining a first variant; when none of the first-type information blocks is detected in the first time window, the first reference power value is dependent on the first variant.

In one embodiment, the first transmitter 1303 also transmits X radio signals, the X first-type information blocks are used for determining time-frequency resources occupied by the X radio signals respectively, the first reference power value is equal to a transmitting power of one of the X radio signals; any of the X radio signals and the first radio signal are transmitted via different air interfaces.

In one embodiment, the first receiver 1301 also receives a third information block; the third information block is used for determining a second variant, the second variant is used for determining a first upper bound value, the first difference is equal to a difference between the first upper bound value and the first reference power value.

In one embodiment, information carried by the first radio signal comprises a first indicator; the first indicator is used for indicating that the first difference is for sidelink, or the first indicator is used for indicating that the first difference is for uplink.

In one embodiment, information carried by the first radio signal comprises a second difference, the first difference and the second difference respectively correspond to a first distance interval and a second distance interval, the first distance interval and the second distance interval are orthogonal.

In one embodiment, wherein an end of the first time window is related to a receiving time of the first signaling, and a start of the first time window is related to a triggering time of a report of the first difference.

Embodiment 14

Figure 14:
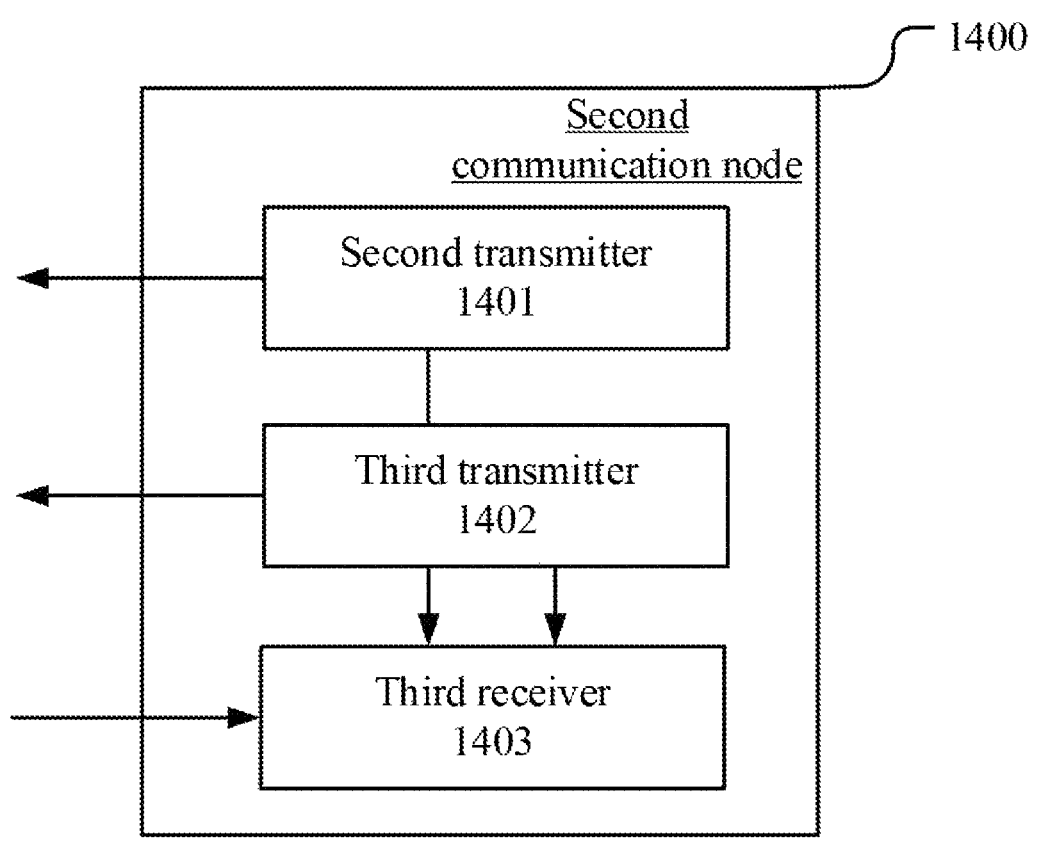
FIG. 14 illustrates a structure block diagram of a processing device in a second communication node according to one embodiment of the present disclosure.

Embodiment 14 illustrates a structure block diagram of one embodiment a processing device in a second communication node, as shown in FIG. 14. In FIG. 14, a second communication node 1400 comprises a second transmitter 1401, a third transmitter 1402 and a third receiver 1403. The second transmitter 1401 comprises the transmitter/receiver 416 (including the antenna 420), the transmitting processor 415 and the controller/processor 440 in FIG. 4 of the present disclosure; the third transmitter 1402 comprises the transmitter/receiver 416 (including the antenna 420), the transmitting processor 415 and the controller/processor 440 in FIG. 4 of the present disclosure; the third receiver 1403 comprises the transmitter/receiver 416 (including the antenna 420), the receiving processor 412 and the controller/processor 440 in FIG. 4 of the present disclosure.

In Embodiment 14, the second transmitter 1401 transmits X first-type information blocks in a first time window; the third transmitter 1402 transmits a first signaling; the third receiver 1403 receives a first radio signal; the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

In one embodiment, the second transmitter 1401 transmits a second information block; the second information block is used for determining a first variant; when none of the first-type information blocks is detected in the first time window, the first reference power value is dependent on the first variant.

In one embodiment, the second transmitter 1401 transmits a third information block; the third information block is used for determining a second variant, the second variant is used for determining a first upper bound value, the first difference is equal to a difference between the first upper bound value and the first reference power value.

In one embodiment, information carried by the first radio signal comprises a first indicator; the first indicator is used for indicating that the first difference is for sidelink, or the first indicator is used for indicating that the first difference is for uplink.

In one embodiment, information carried by the first radio signal comprises a second difference, the first difference and the second difference respectively correspond to a first distance interval and a second distance interval, the first distance interval and the second distance interval are orthogonal.

In one embodiment, wherein an end of the first time window is related to a receiving time of the first signaling, and a start of the first time window is related to a triggering time of a report of the first difference.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first communication node, UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second communication node, base station or network side equipment in the present disclosure includes but is not limited to macro-cellular base stations, micro-cellular base stations, home base stations, relay base station, eNB, gNB, Transmitter Receiver Point (TRP), relay satellites, satellite base station, aerial base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node used for wireless communications, comprising:
   a first receiver, monitoring first-type information blocks in a first time window;
   a second receiver, receiving a first signaling; and
   a first transmitter, transmitting a first radio signal;
   wherein the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

2. The first communication node according to claim 1, wherein the first receiver also receives a second information block, the second information block is used for determining a first variant; when none of the first-type information blocks is detected in the first time window, the first reference power value is dependent on the first variant;
or, the first receiver also receives a third information block, the third information block is used for determining a second variant, the second variant is used for determining a first upper bound value, the first difference is equal to a difference between the first upper bound value and the first reference power value.

3. The first communication node according to claim 1, wherein the first transmitter also transmits X radio signals, the X first-type information blocks are used for determining time-frequency resources occupied by the X radio signals respectively, the first reference power value is equal to a transmitting power of one of the X radio signals; any of the X radio signals and the first radio signal are transmitted via different air interfaces.

4. The first communication node according to claim 1, wherein information carried by the first radio signal comprises a first indicator, the first indicator is used for indicating that the first difference is for sidelink, or the first indicator is used for indicating that the first difference is for uplink.

5. The first communication node according to claim 1, wherein information carried by the first radio signal comprises a second difference, the first difference and the second difference respectively correspond to a first distance interval and a second distance interval, the first distance interval and the second distance interval are orthogonal.

6. The first communication node according to claim 1, wherein an end of the first time window is related to a receiving time of the first signaling, and a start of the first time window is related to a triggering time of a report of the first difference.

7. A second communication node used for wireless communications, comprising:
a second transmitter, transmitting X first-type information blocks in a first time window;
a third transmitter, transmitting a first signaling; and
a third receiver, receiving a first radio signal;
wherein the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

8. The second communication node according to claim 7, wherein the second transmitter transmits a second information block; the second information block is used for determining a first variant; when none of the first-type information blocks is detected in the first time window, the first reference power value is dependent on the first variant;
or, the second transmitter transmits a third information block; the third information block is used for determining a second variant, the second variant is used for determining a first upper bound value, the first difference is equal to a difference between the first upper bound value and the first reference power value.

9. The second communication node according to claim 7, wherein information carried by the first radio signal comprises a first indicator, the first indicator is used for indicating that the first difference is for sidelink, or the first indicator is used for indicating that the first difference is for uplink;
or, information carried by the first radio signal comprises a second difference, the first difference and the second difference respectively correspond to a first distance interval and a second distance interval, the first distance interval and the second distance interval are orthogonal.

10. The second communication node according to claim 7, wherein an end of the first time window is related to a receiving time of the first signaling, and a start of the first time window is related to a triggering time of a report of the first difference.

11. A method in a first communication node used for wireless communications, comprising:
monitoring first-type information blocks in a first time window;
receiving a first signaling; and
transmitting a first radio signal;
wherein the first signaling is used for determining time-frequency resources occupied by the first radio signal; information carried by the first radio signal comprises a first difference, a first reference power value is used for determining the first difference, the first reference power value is a power value for a wireless transmission on sidelink; when there are X first-type information blocks being detected in the first time window, the X first-type information blocks respectively correspond to X first-type parameters, the X is a positive integer greater than 1; the X first-type parameters are used for determining a target parameter, the target parameter is used for determining the first reference power value.

12. The method in the first communication node according to claim 11, comprising:
receiving a second information block, the second information block is used for determining a first variant; when none of the first-type information blocks is detected in the first time window, the first reference power value is dependent on the first variant;
or, comprising:
receiving a third information block, the third information block is used for determining a second variant, the second variant is used for determining a first upper bound value, the first difference is equal to a difference between the first upper bound value and the first reference power value.

13. The method in the first communication node according to claim 11, comprising:
transmitting X radio signals;
wherein the X first-type information blocks are used for determining time-frequency resources occupied by the X radio signals respectively, the first reference power value is equal to a transmitting power of one of the X radio signals; any of the X radio signals and the first radio signal are transmitted via different air interfaces.

14. The method in the first communication node according to claim 11, wherein information carried by the first radio signal comprises a first indicator, the first indicator is used for indicating that the first difference is for sidelink, or the first indicator is used for indicating that the first difference is for uplink.

15. The method in the first communication node according to claim 11, wherein information carried by the first radio signal comprises a second difference, the first difference and the second difference respectively correspond to a first distance interval and a second distance interval, the first distance interval and the second distance interval are orthogonal.

16. The method in the first communication node according to claim 11, wherein an end of the first time window is related to a receiving time of the first signaling, and a start of the first time window is related to a triggering time of a report of the first difference.

17. A method in a second communication node used for wireless communications, comprising:
   transmitting X first-type information blocks in a first time window;
   transmitting a first signaling; and
   receiving a first radio signal;
   wherein the first signaling is used for determining time-frequency resources occupied by the first radio signal; information carried by the first radio signal comprises a first difference, a first reference power value is used for determining the first difference, the first reference power value is a power value for a wireless transmission on sidelink; the X first-type information blocks respectively correspond to X first-type parameters, the X is a positive integer greater than 1; the X first-type parameters are used for determining a target parameter, the target parameter is used for determining the first reference power value.

18. The method in the second communication node according to claim 17, comprising:
   transmitting a second information block; the second information block is used for determining a first variant; when none of the first-type information blocks is detected in the first time window, the first reference power value is dependent on the first variant;
   or comprising:
   transmitting a third information block; the third information block is used for determining a second variant, the second variant is used for determining a first upper bound value, the first difference is equal to a difference between the first upper bound value and the first reference power value.

19. The method in the second communication node according to claim 17, wherein information carried by the first radio signal comprises a first indicator, the first indicator is used for indicating that the first difference is for sidelink, or the first indicator is used for indicating that the first difference is for uplink;
   or, the information carried by the first radio signal comprises a second difference, the first difference and the second difference respectively correspond to a first distance interval and a second distance interval, the first distance interval and the second distance interval are orthogonal.

20. The method in the second communication node according to claim 17, wherein an end of the first time window is related to a receiving time of the first signaling, and a start of the first time window is related to a triggering time of a report of the first difference.

\* \* \* \* \*